US012633671B2

(12) United States Patent
Storm et al.

(10) Patent No.: US 12,633,671 B2
(45) Date of Patent: May 19, 2026

(54) DEPLOYABLE REFLECTOR STRUCTURES, DEPLOYABLE ANTENNA STRUCTURES, AND ASSOCIATED COMPONENTS AND METHODS

(71) Applicant: Northrop Grumman Systems Corporation, Falls Church, VA (US)

(72) Inventors: David Storm, Ventura, CA (US); John Anthony Alvarez, Oxnard, CA (US); Michael Beers, Santa Barbara, CA (US); Nicholas Perez, Ventura, CA (US); Peter B. Laraway, Santa Barbara, CA (US); Stephen Rohweller, Ojai, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 117 days.

(21) Appl. No.: 18/354,335

(22) Filed: Jul. 18, 2023

(65) Prior Publication Data

US 2025/0030172 A1 Jan. 23, 2025

(51) Int. Cl.
*H01Q 15/16* (2006.01)
*H01Q 3/12* (2006.01)

(52) U.S. Cl.
CPC ............. *H01Q 15/168* (2013.01); *H01Q 3/12* (2013.01)

(58) Field of Classification Search
CPC .... H01Q 1/288; H01Q 15/161; H01Q 15/168; H01Q 1/1235; H01Q 15/141; H01Q 1/28; H01Q 15/147; H01Q 7/02
See application file for complete search history.

(56) References Cited

U.S. PATENT DOCUMENTS

| | | | | |
|---|---|---|---|---|
| 4,373,690 A * | 2/1983 | Stillman | B64G 1/2229 | 244/172.6 |
| 5,680,145 A | 10/1997 | Thomson et al. | | |
| 5,864,324 A * | 1/1999 | Acker | H01Q 15/161 | 343/915 |
| 6,505,381 B1 * | 1/2003 | Thomson | B64G 1/2229 | 16/302 |
| 10,170,843 B2 | 1/2019 | Thomson et al. | | |
| 10,256,530 B2 | 4/2019 | Freebury et al. | | |
| 10,587,035 B2 | 3/2020 | Freebury et al. | | |
| 10,847,893 B2 | 11/2020 | Dominocielo et al. | | |

(Continued)

FOREIGN PATENT DOCUMENTS

JP 2003095199 A * 4/2003

OTHER PUBLICATIONS

JP 2003095199 Translation (Year: 2003).*

(Continued)

*Primary Examiner* — Dameon E Levi
*Assistant Examiner* — Gurbir Singh
(74) *Attorney, Agent, or Firm* — Dority & Manning, P.A.

(57) ABSTRACT

A deployable reflector structure includes a base in a central portion of the deployable reflector structure. The deployable reflector structure further includes one or more arms configured to extend from the base. The deployable reflector structure also includes an expandable structure coupled to the one or more arms. The deployable reflector structure further includes a reflector coupled between the one or more arms and the base. A drive mechanism may be configured to extend one or more of the arms and the expandable structure with a drive cable.

15 Claims, 29 Drawing Sheets

(56) References Cited

U.S. PATENT DOCUMENTS

| | | | | |
|---|---|---|---|---|
| 2011/0187627 A1* | 8/2011 | Palmer | H01Q 15/161 343/915 |
| 2015/0194733 A1* | 7/2015 | Mobrem | H01Q 15/161 343/915 |

OTHER PUBLICATIONS

JP-2003095199-A Translation (Year: 2003).*
"9/9/8 S-Band Radial Rib Reflector High-accuracy, low-stowed volume reflector," L3HARRIS, 2020, p. 1.
"KaPDA-Gimbal 2-Axis Gimbal, Control System, and High Gain Antenna," Tendeg, Jul. 2021, pp. 2.
"Katenna Deployable High Gain Antenna For Small Satellites," Tendeg, Jan. 2018, pp. 2.
"RainCube (KaPDA) Antenna Ground Test Deployment," Retrieved from https://www.youtube.com/watch?v=5rCXOOGsfDY, Retrieved on Oct. 26, 2022, p. 1.
"Umbra Introduction Film," Retrieved from https://www.youtube.com/watch?v=QsmFgaoOWuw, Retrieved on Oct. 26, 2022, p. 1.
"Wrapped Rib Antenna," Oxford space systems, retrieved from https://oxford.space/wrapped-rib/, Oct. 27, 2022, pp. 4.
Deployable Ka/Ku-Band Antenna For Small Satellites (KaPDA), Tendeg, Jan. 2018, pp. 2.

* cited by examiner

DEPLOYABLE REFLECTOR STRUCTURES, DEPLOYABLE ANTENNA STRUCTURES, AND ASSOCIATED COMPONENTS AND METHODS

TECHNICAL FIELD

Embodiments of the disclosure generally relate to antenna structures. In particular, embodiments of the disclosure relate to deployable antenna structures and associated components and methods.

BACKGROUND

Reflectors for concentrating radiofrequency (RF) radiation are employed in a variety of antennas installed in spacecraft or mounted on the ground. Reflectors for concentrating solar radiation are employed as solar energy collectors in systems for converting solar energy into electrical energy.

Satellite and communications technologies often require that space-based devices and other high technology machinery be lightweight yet durable to withstand the effects of the space environment. Such devices, however, must also be practically devised to be launched from Earth in a small package and deployed in space autonomously. For example, a vehicle intended to be launched into space may have cross-sectional limitations and weight limitations to accommodate the launch vehicle, such as a rocket. The effectiveness of an antenna may be associated with a surface area of the antenna. For example, increasing a surface area of an antenna may increase the quality and/or coverage of signals received by and/or transmitted by the antenna. An expandable antenna may be stored in a small space during transportation and may expand to form an antenna with a larger surface area when deployed.

BRIEF SUMMARY

Embodiments of the disclosure include a deployable reflector structure. The deployable reflector structure includes a base in a central portion of the deployable reflector structure. The antenna structure further includes one or more arms configured to extend from the base. The antenna structure also includes an expandable structure coupled to the one or more arms. The antenna structure further includes a reflector mesh coupled between the one or more arms and the base.

Another embodiment of the disclosure includes an expandable antenna structure. The expandable antenna structure at least two arms. The expandable antenna structure further includes an expandable structure coupled to the at least two arms. The expandable antenna structure also includes a first carrier slidably coupled to a first arm of the at least two arms. The first carrier is coupled to a section of the expandable structure on a first end of the section of the expandable structure. The expandable antenna structure further includes a second carrier slidably coupled to a second arm of the at least two arms. The second carrier is coupled to a second end of the section of the expandable structure opposite the first end. The expandable antenna structure also includes a cable drive apparatus. The expandable antenna structure further includes a driving cable coupled to the cable drive apparatus, the driving cable passing through diagonal truss structures in the section of the expandable structure. The diagonal truss structures define an alternating diagonal path through the section of the expandable structure from the first end of the section of the expandable structure to the second end of the expandable structure.

Another embodiment of the disclosure includes a method of extending an antenna. The method includes rotating an arm away from a tower. The method further includes spooling a drive cable onto a spool. The method also includes pulling a carrier along the arm with the drive cable. The method further includes shortening a diagonal truss member of an extendable structure with the drive cable causing the extendable structure to expand away from the tower.

BRIEF DESCRIPTION OF THE DRAWINGS

While the specification concludes with claims particularly pointing out and distinctly claiming embodiments of the disclosure, the advantages of embodiments of the disclosure may be more readily ascertained from the following description of embodiments of the disclosure when read in conjunction with the accompanying drawings in which:

DETAILED DESCRIPTION

Figure 1:
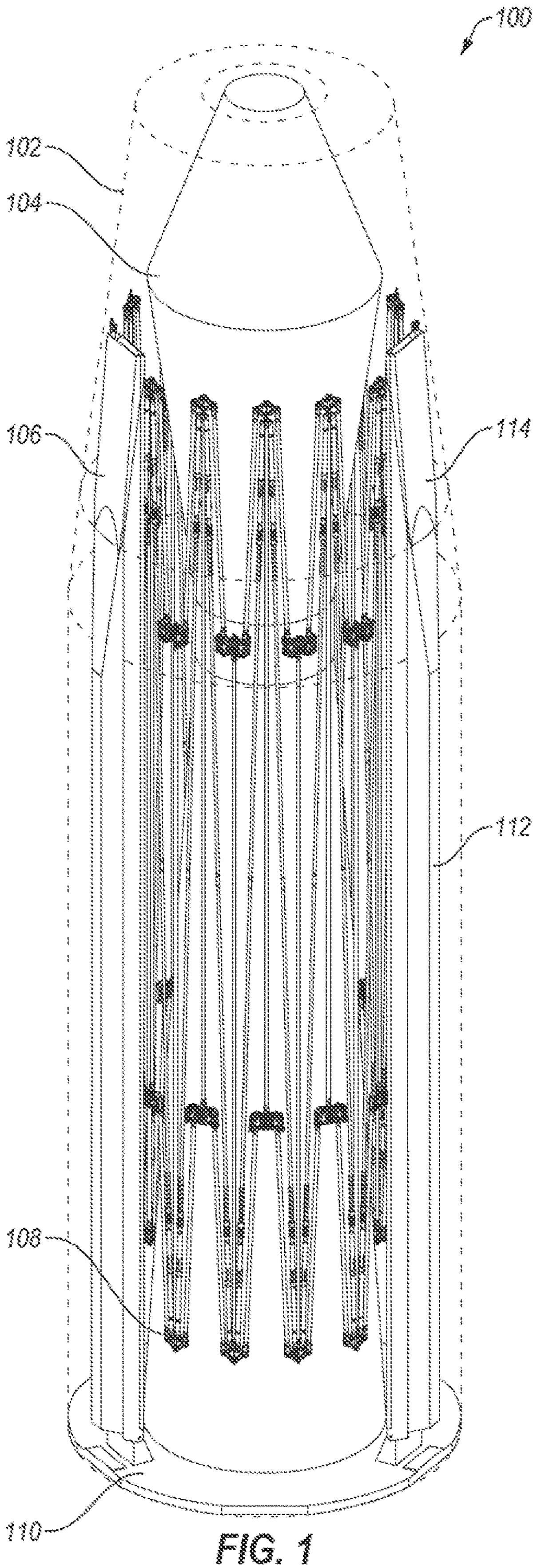
FIG. 1 through FIG. 5 illustrate an antenna structure in different stages of deployment in accordance with embodiments of the disclosure.

The following description provides specific details, such as material compositions, shapes, and sizes, in order to provide a thorough description of embodiments of the disclosure. However, a person of ordinary skill in the art would understand that the embodiments of the disclosure may be practiced without employing these specific details. Indeed, the embodiments of the disclosure may be practiced in conjunction with conventional techniques employed in the industry.

Drawings presented herein are for illustrative purposes only, and are not meant to be actual views of any particular material, component, structure, device, or system. Variations from the shapes depicted in the drawings as a result, for example, of manufacturing techniques and/or tolerances, are to be expected. Thus, embodiments described herein are not to be construed as being limited to the particular shapes or regions as illustrated, but include deviations in shapes that result, for example, from manufacturing. For example, a region illustrated or described as box-shaped may have rough and/or nonlinear features, and a region illustrated or described as round may include some rough and/or linear features. Moreover, sharp angles that are illustrated may be rounded, and vice versa. Thus, the regions illustrated in the figures are schematic in nature, and their shapes are not intended to illustrate the precise shape of a region and do not limit the scope of the present claims. The drawings are not necessarily to scale. Additionally, elements common between figures may retain the same numerical designation.

As used herein, the terms "configured" and "configuration" refers to a size, a shape, a material composition, a material distribution, orientation, and arrangement of at least one feature (e.g., one or more of at least one structure, at least one material, at least one region, at least one device) facilitating use of the at least one feature in a pre-determined way.

As used herein, the term "substantially" in reference to a given parameter means and includes to a degree that one skilled in the art would understand that the given parameter, property, or condition is met with a small degree of variance, such as within acceptable manufacturing tolerances. By way of example, depending on the particular parameter, property, or condition that is substantially met, the parameter, property, or condition may be at least 90.0 percent met, at least 95.0 percent met, at least 99.0 percent met, at least 99.9 percent met, or even 100.0 percent met.

As used herein, "about" or "approximately" in reference to a numerical value for a particular parameter is inclusive of the numerical value and a degree of variance from the numerical value that one of ordinary skill in the art would understand is within acceptable tolerances for the particular parameter. For example, "about" or "approximately" in reference to a numerical value may include additional numerical values within a range of from 90.0 percent to 110.0 percent of the numerical value, such as within a range of from 95.0 percent to 105.0 percent of the numerical value, within a range of from 97.5 percent to 102.5 percent of the numerical value, within a range of from 99.0 percent to 101.0 percent of the numerical value, within a range of from 99.5 percent to 100.5 percent of the numerical value, or within a range of from 99.9 percent to 100.1 percent of the numerical value.

As used herein, relational terms, such as "beneath," "below," "lower," "bottom," "above," "upper," "top," "front," "rear," "left," "right," and the like, may be used for ease of description to describe one element's or feature's relationship to another element(s) or feature(s) as illustrated in the drawings. Unless otherwise specified, the spatially relative terms are intended to encompass different orientations of the materials in addition to the orientation depicted in the figures. For example, if materials in the figures are inverted, elements described as "below" or "beneath" or "under" or "on bottom of" other elements or features would then be oriented "above" or "on top of" the other elements or features. Thus, the term "below" can encompass both an orientation of above and below, depending on the context in which the term is used, which will be evident to one of ordinary skill in the art. The materials may be otherwise oriented (e.g., rotated 90 degrees, inverted, flipped) and the spatially relative descriptors used herein interpreted accordingly.

As used herein, the singular forms "a," "an," and "the" are intended to include the plural forms as well, unless the context clearly indicates otherwise.

As used herein, the term "and/or" means and includes any and all combinations of one or more of the associated listed items.

As used herein, the terms "vertical," "longitudinal," "horizontal," and "lateral" are in reference to a major plane of a structure and are not necessarily defined by earth's gravitational field. A "horizontal" or "lateral" direction is a direction that is substantially parallel to the major plane of the structure, while a "vertical" or "longitudinal" direction is a direction that is substantially perpendicular to the major plane of the structure. The major plane of the structure is defined by a surface of the structure having a relatively large area compared to other surfaces of the structure. With reference to the drawings, a "horizontal" or "lateral" direction may be perpendicular to an indicated "Z" axis, and may be parallel to an indicated "X" axis and/or parallel to an indicated "Y" axis; and a "vertical" or "longitudinal" direction may be parallel to an indicated "Z" axis, may be perpendicular to an indicated "X" axis, and may be perpendicular to an indicated "Y" axis.

As described above, antennas may be expandable, such that the antenna may be stored in a small space during transportation and may expand to form an antenna with a larger surface area when deployed. Expandable antennas may be formed from a conductive mesh, such as a knitted gold-plated molybdenum wire. The mesh antennas may be coupled to an expandable structure. A conventional expandable structure includes a drive configured to expand the structure coupled to a point on a perimeter of the expandable structure. Positioning the drive on the perimeter of the structure may limit a size of the expandable structure. The drive positioned on the perimeter of the structure may also limit mounting locations for the expandable antenna. Furthermore, expandable structures with no central support may have reduced surface accuracy and stiffness.

FIG. 1 illustrates an antenna 100 according to embodiments of the disclosure in a stowed configuration. The antenna 100 in the stowed configuration may be configured to fit within a stowed volume 102. The size and shape of the stowed volume 102 may be defined by parameters of an associated vehicle, such as a space vehicle (e.g., space capsule, rocket, satellite, etc.). The antenna 100 may include a tower 104 coupled to a base 110. The antenna 100 may also include one or more arms 106 coupled to the base 110. An expandable structure 108 may be coupled between the tower 104 and the arms 106.

In the stowed configuration, the arms 106 may be positioned in a substantially parallel arrangement with the tower 104 and the expandable structure 108 may extend about the circumference of the tower 104, substantially surrounding the tower 104. The antenna 100 may form a substantially cylindrical shape defined by the arms 106 and the expandable structure 108. The cylindrical shape of the stowed antenna 100 may have a major dimension (e.g., width, diameter, radius, apothem, etc.) of less than or equal to the corresponding major dimension of the base 110. For example, if the base 110 is circular, the cylindrical shape formed by the arms 106 and the expandable structure 108 may have a diameter less than or equal to a diameter of the base 110. In some embodiments, the base 110 may have a non-circular shape, such as a square shape, a triangular shape, an oval shape, etc.

The arms 106 may include a shaft 112 and a tip 114. The shaft 112 may have a substantially constant cross-sectional area. For example, the shaft 112 may be rectangular as illustrated in FIG. 1 and may have a substantially constant height and width along the length of the shaft 112. The tip 114 of the arms 106 may be tapered, such that the cross-sectional area of the tip 114 may gradually reduce as a distance from the base 110 increases as illustrated in FIG. 1. The tapered tip 114 may facilitate fitting the antenna 100 into the stowed volume 102 in the stowed configuration. In some embodiments, the entire length of the arm 106 may be tapered, such that a cross-sectional area of the arm 106 gradually reduces as a distance from the base 110 increases. In other embodiments, the entire length of the arm 106 may have a substantially constant cross-sectional area. A reflector (not shown in FIG. 1) may be stowed within an annulus defined between the tower 104 and the expandable structure 108. While embodiments of the disclosure illustrate three arms 106 extending from the base 110 of the antenna 100, two arms 106 or four or more arms 106 may be present.

Figure 2:
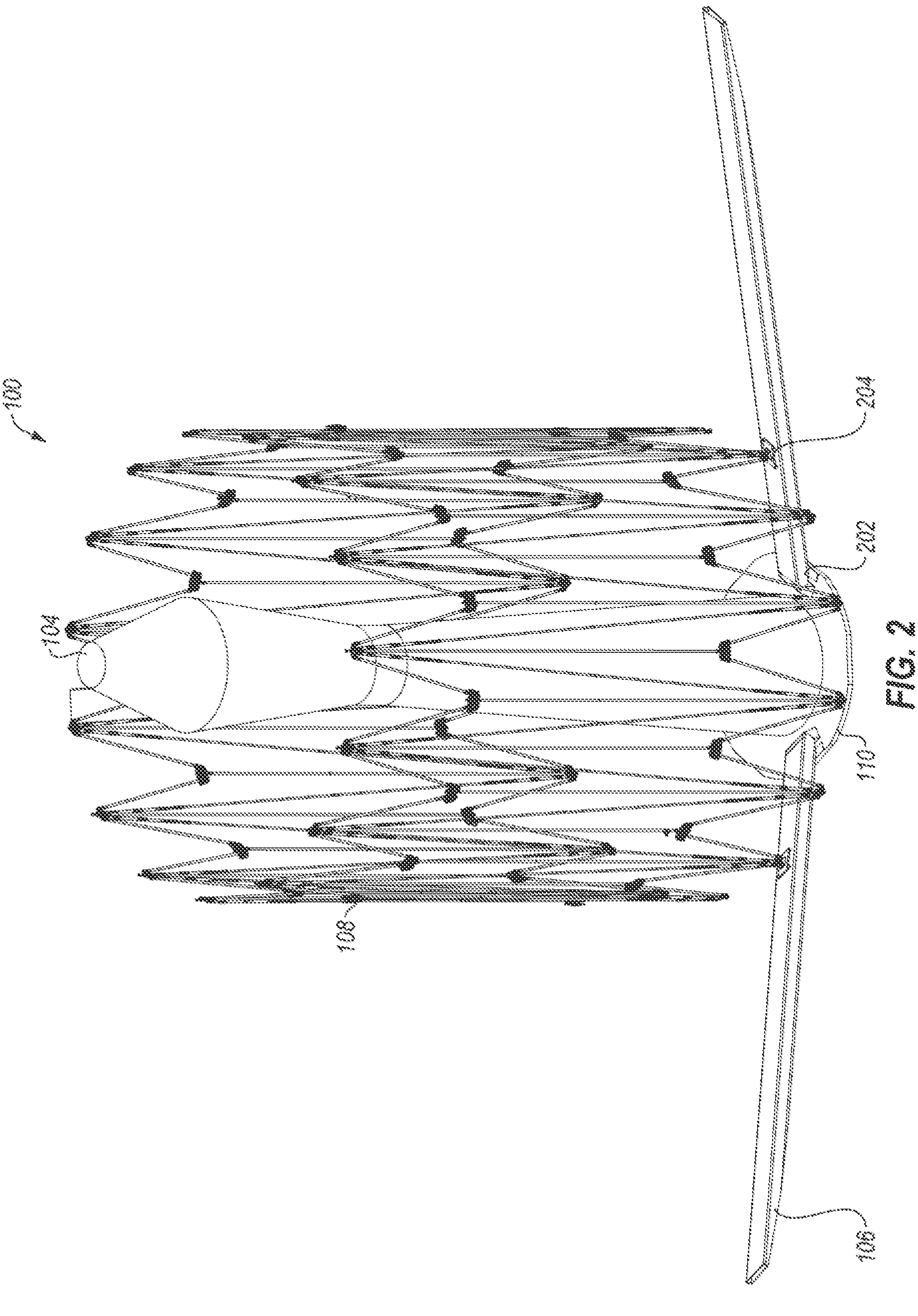
Figure 3:
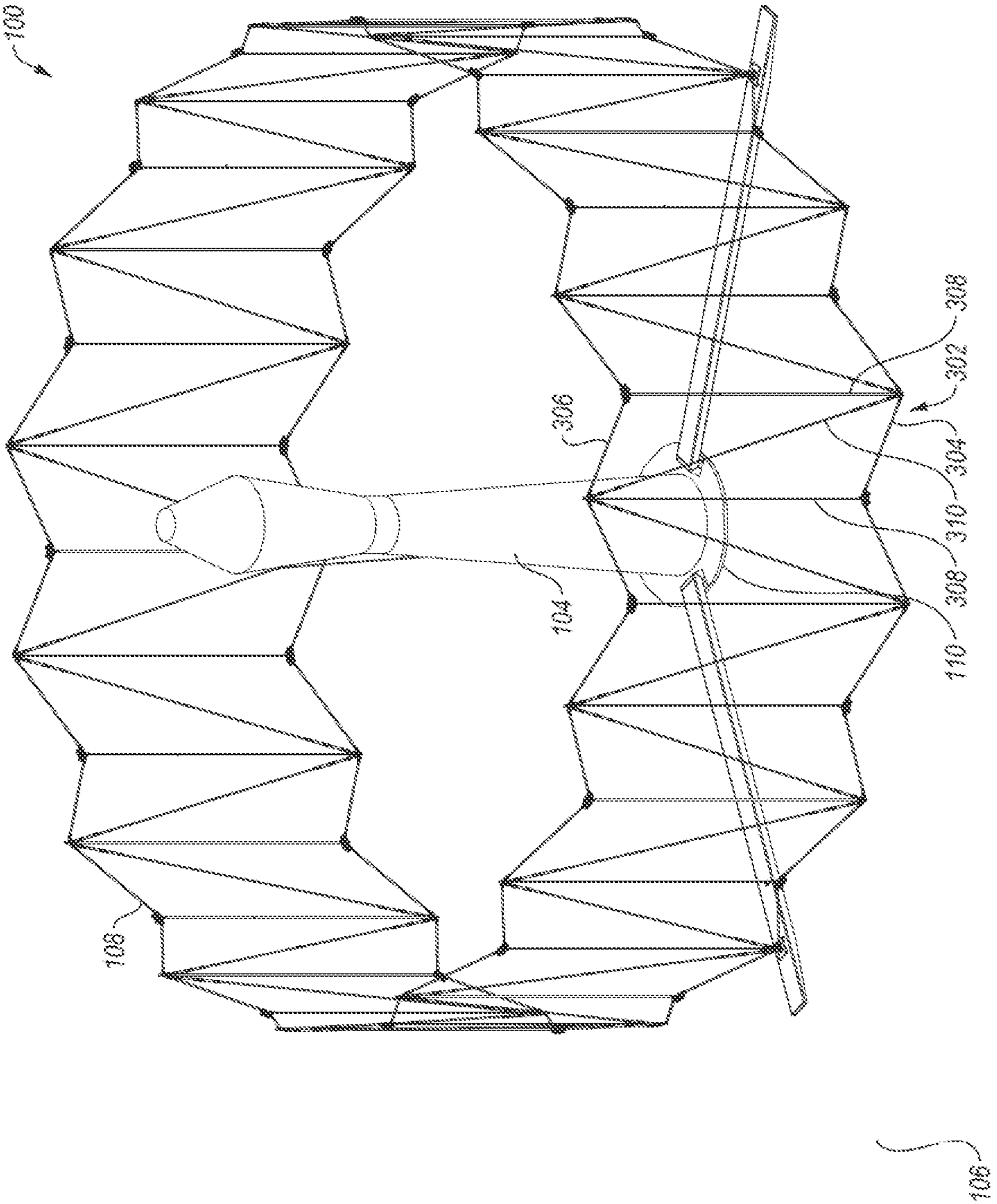
Figure 4:
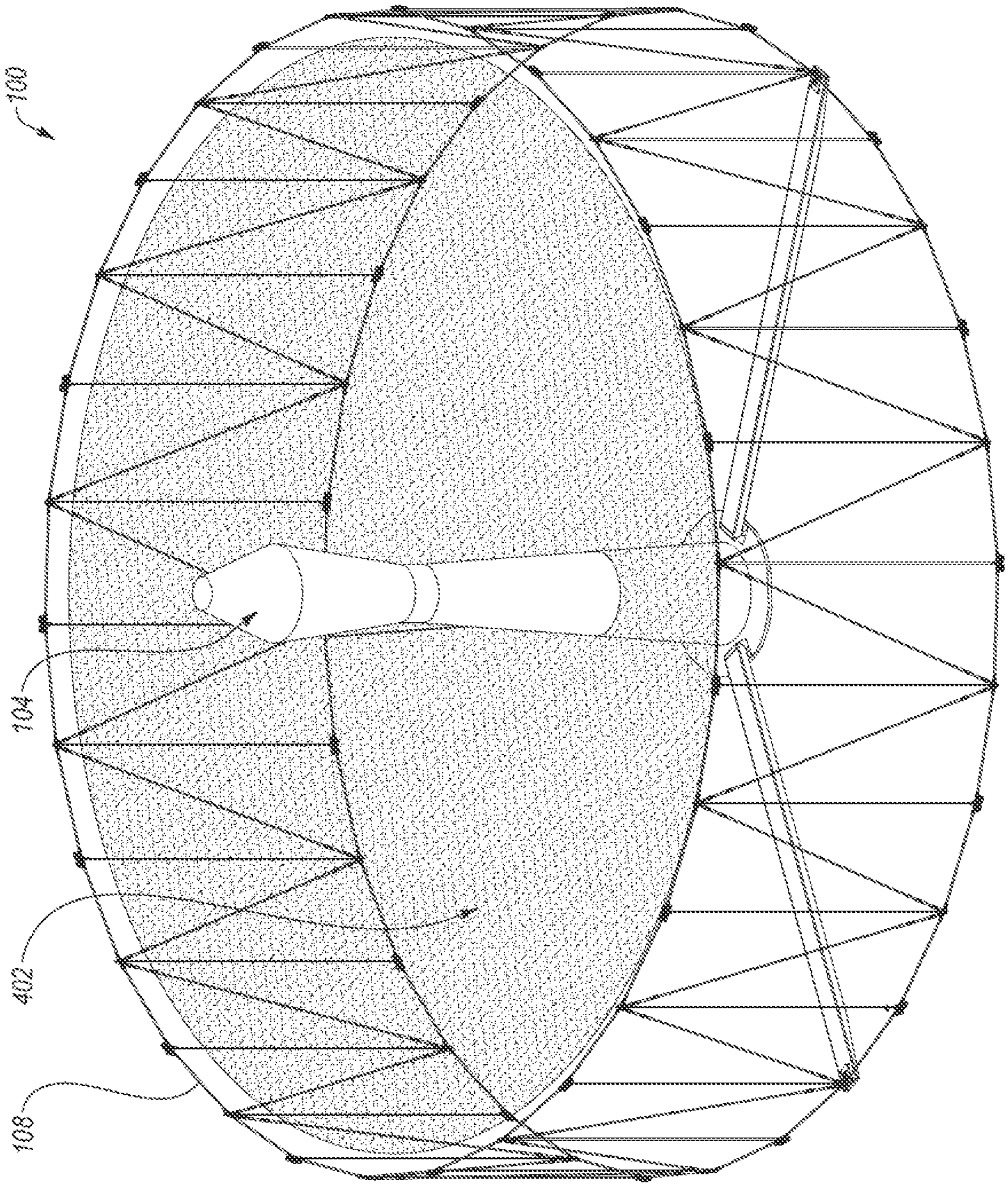

FIGS. 2 through 4 illustrate the antenna 100 at different stages of extending (e.g., expanding) the antenna 100 from the stowed configuration illustrated in FIG. 1. The arms 106 may rotate away from the tower 104 on hinged connections 202. The hinged connections 202 may couple the arms 106 to the base 110, such that the arms 106 extend away from the base 110 in the extended position. The hinged connections 202 may include elements or components that provide mechanical assistance to rotate the arms 106 away from the tower 104. For example, the hinged connections 202 may be configured to be driven, such as by a motor or a cable and pulley arrangement, as described in further detail below with respect to FIG. 8A and FIG. 8B. In other embodiments, the hinged connections 202 may include a biasing element configured to bias the hinged connections 202 towards an extended position, such that when a latch releases the associated arms 106, the biasing element may cause the hinged connections 202 to rotate the arms 106 away from the tower 104.

Rotating the arms 106 away from the tower 104 may cause the expandable structure 108 to begin expanding radially away from the tower 104. For example, portions of the expandable structure 108 may be coupled to the arms 106 at movable connection points 204. The movable connection points 204 may cause the expandable structure 108 to extend to maintain the connection between the expandable structure 108, the movable connection points 204, and the arms 106.

The movable connection points 204 may move along the arms 106 in an outward radial direction away from the tower 104, which may further expand the expandable structure 108, as illustrated in FIG. 3. The expandable structure 108 may be a truss-like structure including multiple segments 302 (e.g., bays) formed from two sets of parallel structures, such as rods, pins, shafts, etc. The two sets of parallel structures may include parallel truss members 304, 306, such as a bottom truss member 304 (e.g., a bottom longeron) and a top truss member 306 (e.g., a top longeron) and parallel vertical truss members 308 (e.g., battens). The truss members 304, 306 and the vertical truss members 308 may be formed from rigid lightweight materials, such as metals (e.g., titanium, aluminum, etc.) or composite materials (e.g., carbon fiber, fiberglass, etc.). Each of the vertical truss members 308 may have substantially the same length as one another and each of the bottom truss members 304 may have substantially the same length as the corresponding top truss members 306. Thus, each segment 302 may form a parallelogram shape during deployment of the antenna 100. Each segment 302 may also include a diagonal truss structure 310 (e.g., diagonal truss member) extending diagonally between two corners of the segment 302, such as between a corner between the top truss member 306 and a vertical truss member 308 and a corner between the bottom truss member 304 and an adjacent vertical truss member 308. The diagonal truss structure 310 may be configured to change in length such that a shape defined by the segment 302 may change until each of the corners form angles of about 90°. When each of the corners form angles of about 90°, the expandable structure 108 may be at its largest diameter as illustrated in FIG. 4. Thus, the arms 106 are attached to and extend from a central region of the antenna 100, such as from the base 110. Connections to deploy the arms 106 are also mounted (e.g., attached to) the central region of the antenna 100.

When the expandable structure 108 is at its largest diameter, a reflector 402, such as a mesh reflector, may be stretched across the expandable structure 108, as illustrated in FIG. 4. In some embodiments, the reflector 402 may be coupled directly to the expandable structure 108, such that as the expandable structure 108 expands, the reflector 402 may expand along with the expandable structure 108. In other embodiments, the reflector 402 may be stretched from the tower 104 to the expandable structure 108 in a separate act, such as by drive cables and/or a cable and pulley system. The reflector 402 may be formed from a flexible mesh, such as a knitted or woven material formed from chords or wires of a reflective material, such as gold-plated molybdenum wire. When fully expanded the reflector 402 may have a concave face. The concave face may be configured to reflect signals (e.g., radio waves) impinging on the reflector 402 to a desired position. For example, the reflector 402 may be configured to reflect signals toward the tower 104, which may include a device configured to receive and/or interpret the signals. In other examples, the reflector 402 may be configured to reflect signals from the tower 104 toward another receiving device, such as a receiving device on earth (e.g., the reflector 402 may be used to send signals).

Figure 5:
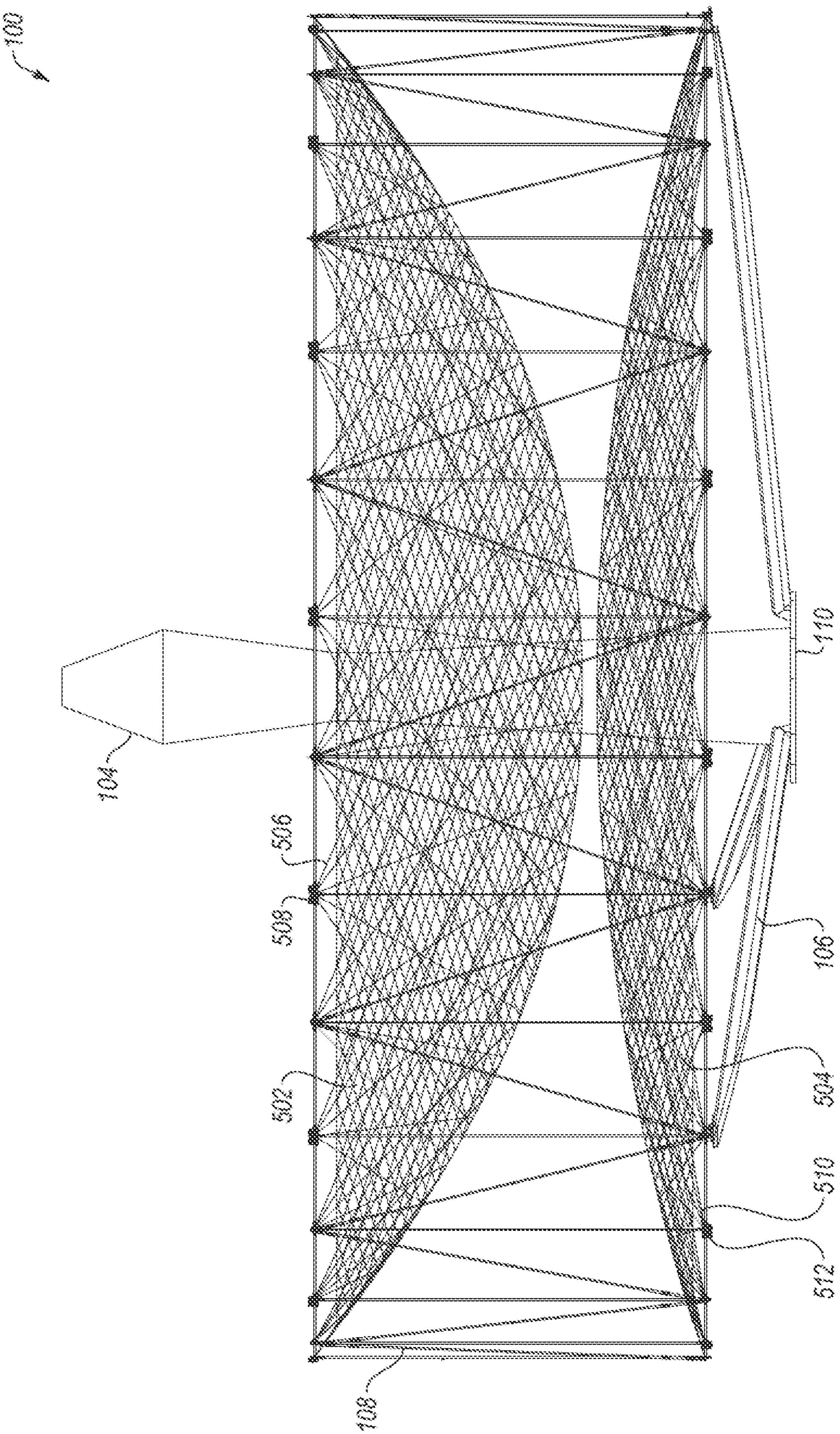

In some embodiments, the antenna 100 may include two mesh 502, 504, as illustrated in FIG. 5. For example, the antenna 100 may include a forward mesh 502 facing toward the tower 104 and a rear mesh 504 facing away from the tower 104. The meshes 502, 504 may form a concave surface in a direction that the respective mesh 502, 504 is facing. The concave surface may be configured to reflect signals (e.g., radio waves) impinging on the meshes 502, 504 to a desired position. For example, the forward mesh 502 may be configured to reflect signals toward the tower 104, which may include a device configured to receive and/or interpret the signals.

The meshes 502, 504 may be formed from a flexible mesh, such as a knitted or woven material formed from chords or wires of a reflective material, such as gold-plated molybdenum wire. Some of the chords or wires may extend to joints 508, 512 of the expandable structure 108 and may act as securing chords 506, 510. In other examples, additional chords or wires may be coupled to the mesh reflectors 502, 504 to act as securing chords 506, 510.

The securing chords 506, 510 may couple the associated reflector 502, 504 to the expandable structure 108. In some embodiments, the securing chords 506, 510 may be coupled directly to the expandable structure 108, such that as the expandable structure 108 expands to its extended size, the reflectors 502, 504 may extend with the expandable structure 108. In other embodiments, the securing chords 506, 510 may be coupled to a driving cable configured to extend the reflectors 502, 504 after the expandable structure 108 has extended to its extended size.

Figure 6:
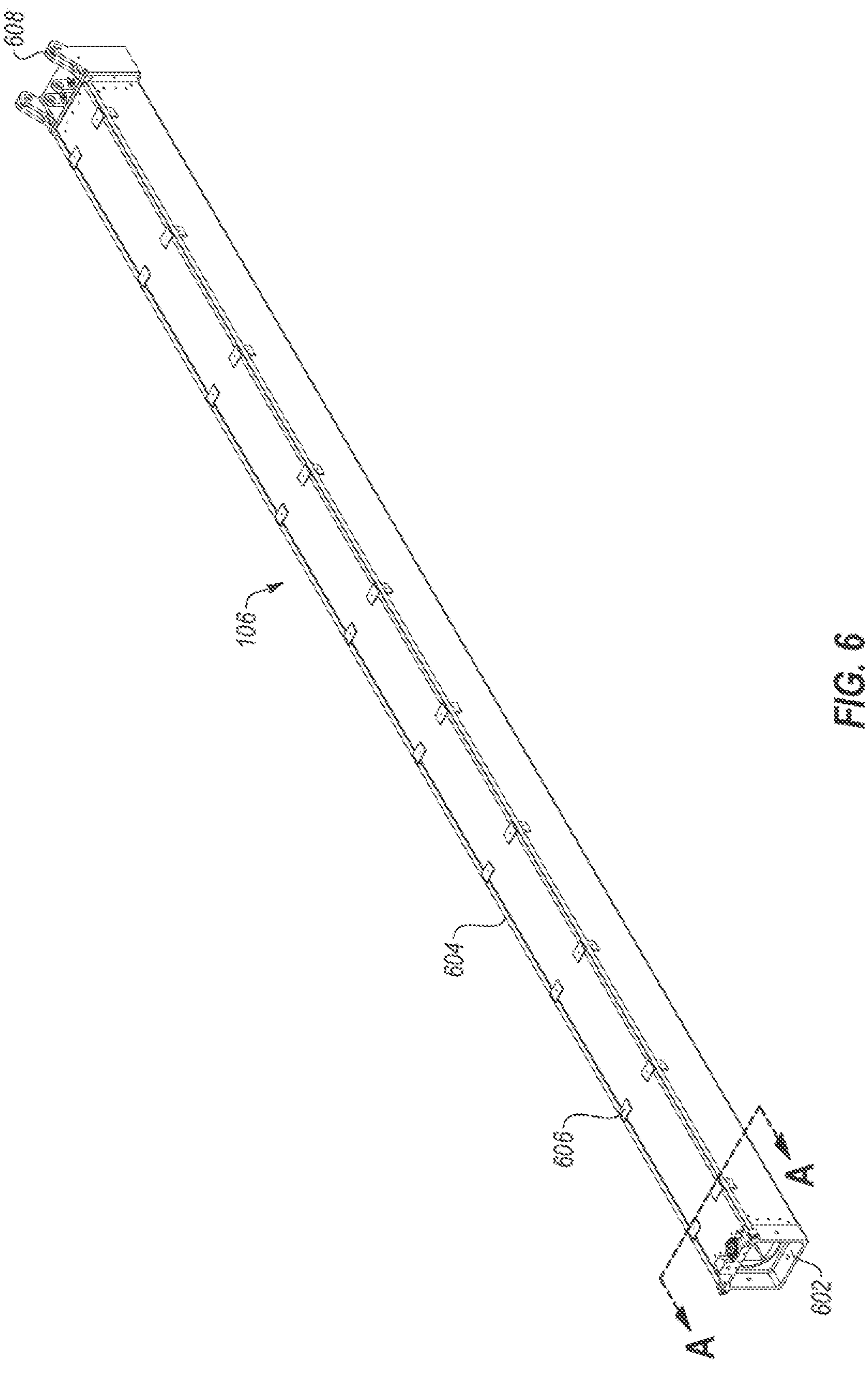
FIG. 6 illustrates a perspective view of an arm of the antenna structure of FIGS. 1 through 5.

FIG. 6 illustrates an enlarged view of an arm 106 of the antenna 100. The arm 106 may include a hinge cap 608 on a proximal end of the arm 106 (e.g., the end of the arm 106 closest to the base 110) and an end cap 602 on a distal end of the arm 106 (e.g., the end of the arm 106 distal from the base 110).

In some examples, the hinged caps 608 and/or the end caps 602 may also be coupled to the respective arms 106 through a hardware connection (e.g., bolts, screws, rivets, etc.). In other examples, the hinged caps 608 and/or the end caps 602 may be secured to the arms 106, through a permanent connection, such as a weld, solder, adhesive, bonding, etc. In another example, the hinged caps 608 and/or the end cap 602 may be formed as part of the arm 106.

The arms 106 may be formed from a rigid light weight material, such as light weight metal materials (e.g., aluminum, titanium, etc.), polymer materials (e.g., polyetheretherketone (PEEK), poly(methyl methacrylate) (PMMA), etc.), or composite materials (e.g., carbon fiber, fiberglass, etc.). In some embodiments, the hinged caps 608 and the end caps 602 may be formed from the same material as the arms 106. In other embodiments, the hinged caps 608 and/or the end caps 602 may be formed from a different rigid light weight material than the arms 106 and attached thereto.

The arms 106 may be substantially hollow components, such as tubular structures (e.g., rectangular tubes, cylindrical tubes, etc.). The tubular structures of the arms 106 may facilitate components, such as driving cables, passing through the arms 106. For example, cables may be run internally through the hollow portions of the arms 106. In some embodiments, cables may also be run externally along the arms 106. The cables may be configured to apply forces to different elements of the antenna 100 to expand the different components of the antenna 100. The tubular structures of the arms 106 may also result in a reduction in weight of the arms 106. In aerospace applications, weight considerations may substantially drive designs, such that a reduction in weight may facilitate increases in size and/or the inclusion of additional components in the associated vehicle. In some embodiments, the arms 106 may be configured to increase in length when they expand, such as through a telescoping feature. For example, the arms 106 may include one or more nested tubes that may telescope out to increase a length of the arms 106 in an extended (e.g., a deployed) position.

The arms 106 may also include anchors 606 configured to secure rails 604 run externally along the arms 106. The rail 604 may be configured to receive a rolling connector (e.g., a trolley, roller, movable connection point 204, movable connector, etc.) and secure the rolling connector to the associated arm 106. The rail 604 and the interface with the rolling connector is described in further detail below with respect to FIG. 7, FIG. 12A, and FIG. 12B.

Figure 7:
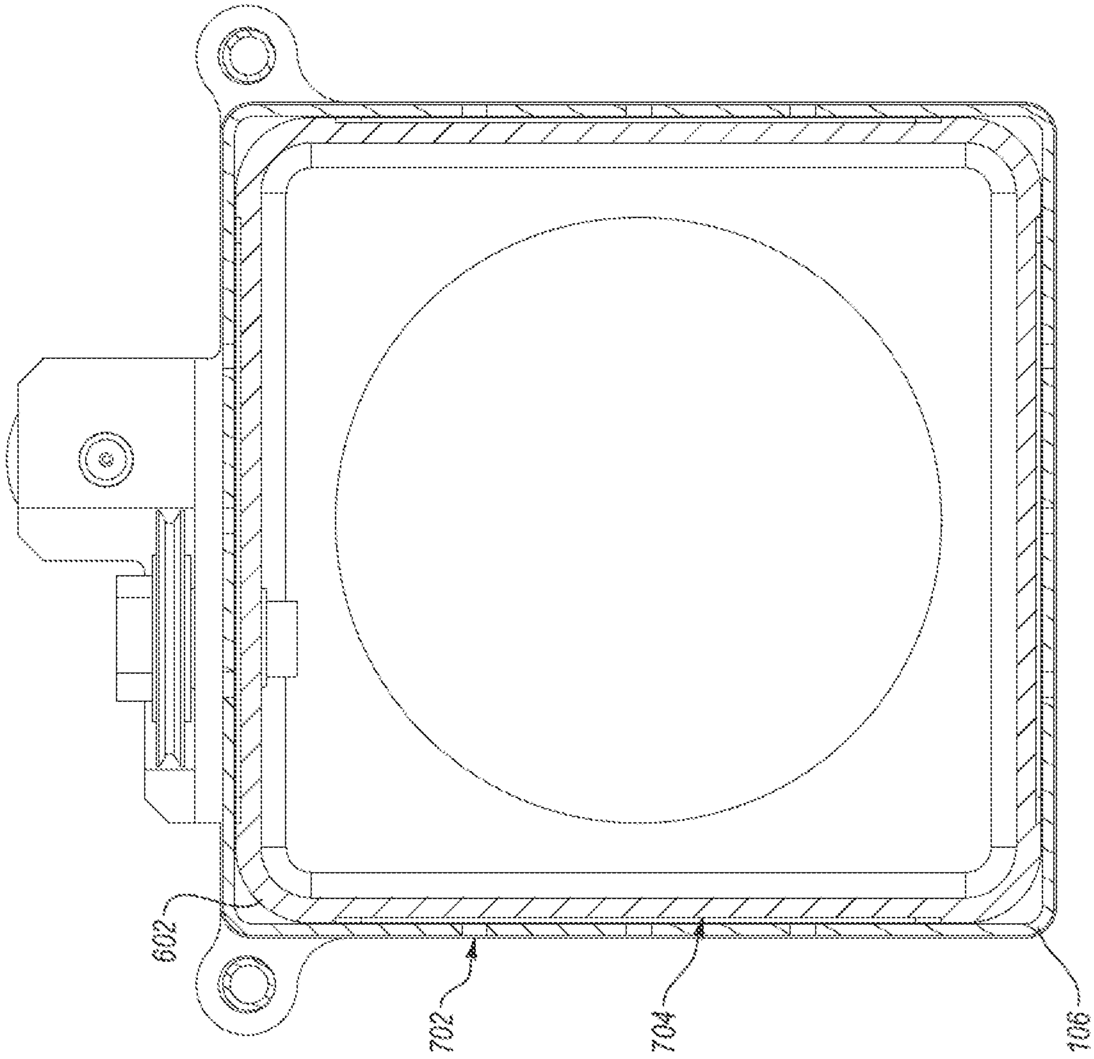
FIG. 7 illustrates a cross-sectional view of the arm of FIG. 6.

FIG. 7 illustrates a cross-sectional view of an end of the arm 106 at the line A-A during a bonding process. As described above, the end cap 602 and the hinge cap 608 may be coupled to the arm 106 through a bonding process. While FIG. 7 illustrates the bonding process between the end cap 602 and the arm 106 on the distal end of the arm 106, the hinge cap 608 may be bonded to the arm 106 in substantially the same process.

The end cap 602 may have a major dimension (e.g., width, diameter, radius, etc.) that is less than a same major dimension of the hollow portion of the arm 106. The end cap 602 may be disposed into the hollow portion of the arm 106. A gap 704 may be defined between the arm 106 and the end cap 602 as illustrated in FIG. 7. The arm 106 may include multiple injection ports 702 through the arm 106 on each side of the arm 106. The injection ports 702 may facilitate the injection of a bonding agent, such as an epoxy or other adhesive material, into the gaps 704. The bonding agent may substantially fill the gaps 704. After the bonding agent cures, the bonding agent may secure the end cap 602 to the arm 106.

Figure 8A:
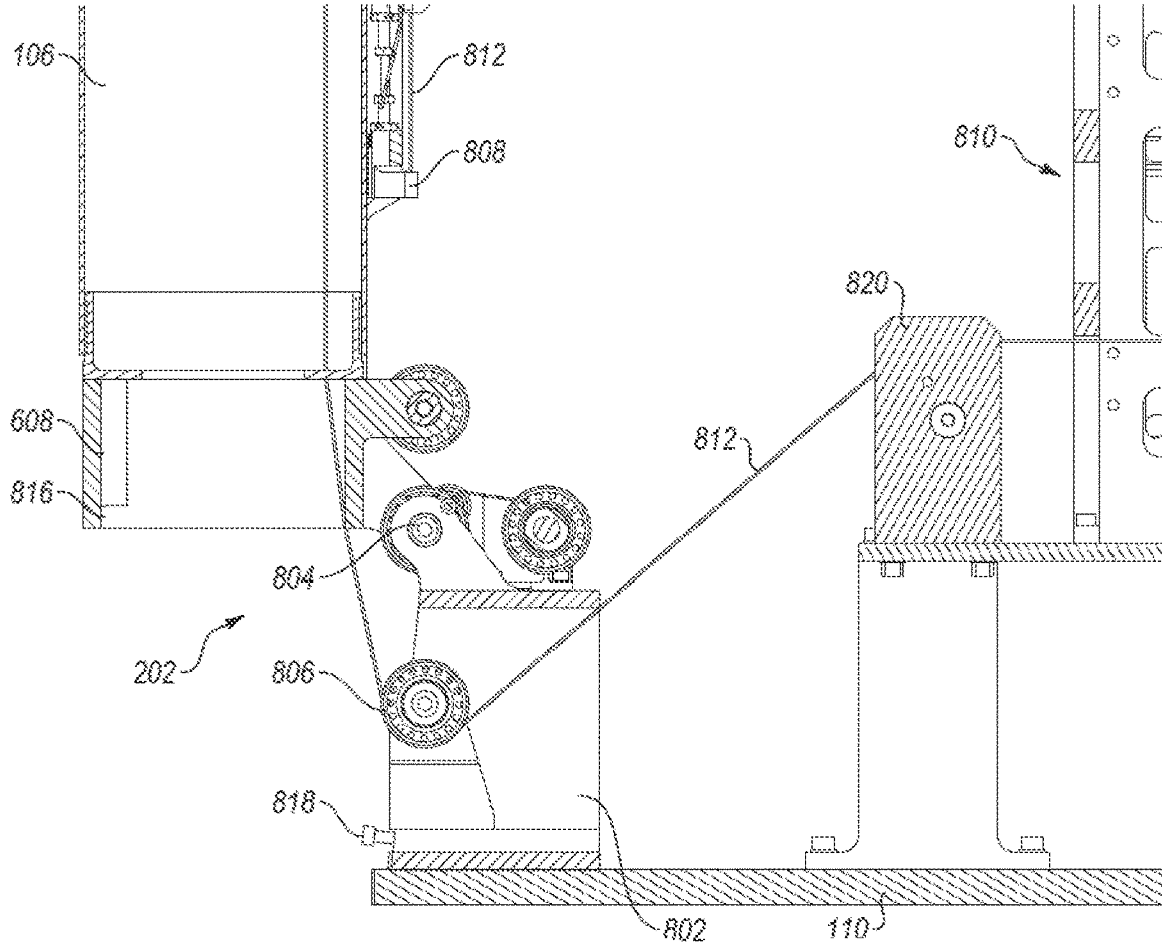
FIGS. 8A and 8B illustrate a hinged connection of the antenna structure of FIGS. 1 through 5.
Figure 8B:
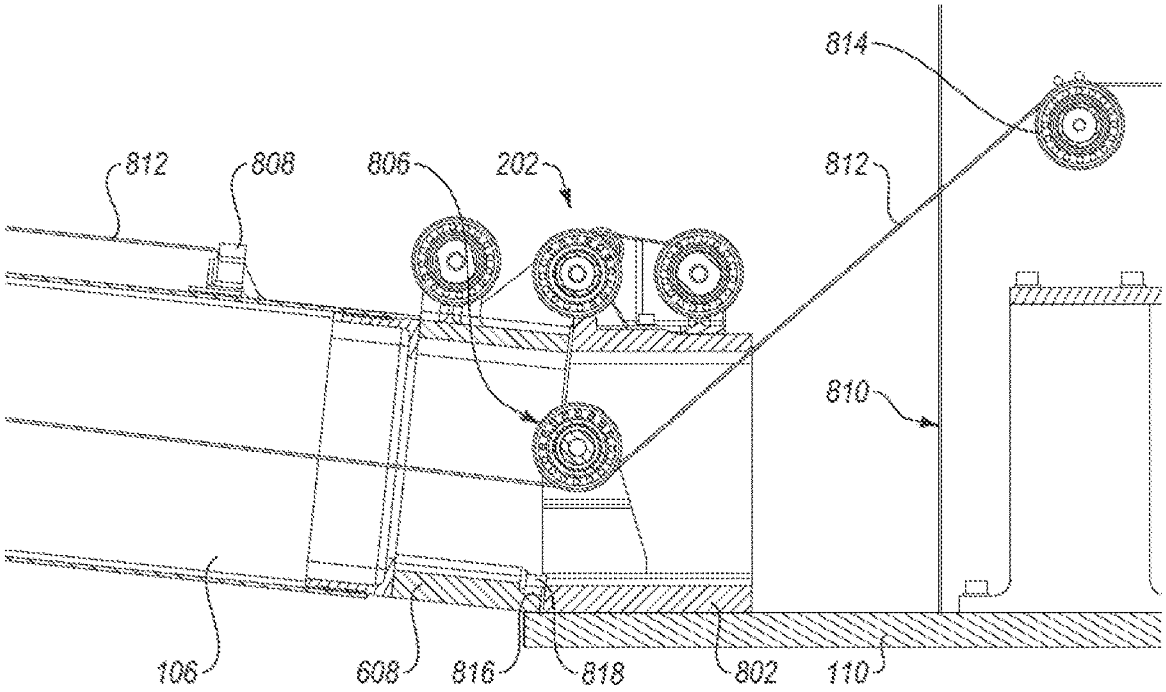

FIG. 8A illustrates an enlarged cross-sectional view of the hinged connection 202 in the stowed configuration and FIG. 8B illustrates an enlarged cross-sectional view of the hinged connection 202 in the extended configuration. As described above, the hinged connections 202 may include components or elements that provide mechanical assistance to extend the associated arms 106. FIG. 8A and FIG. 8B illustrate a cable assistance system. The system includes a hinge cable 812 that passes through a hinge pulley 806 and then through a hollow space within the associated arm 106 and out the distal end of the arm 106 before passing over an exterior portion of the arm 106 and being secured to an anchor 808 on the arm 106.

The hinge pulley 806 may be secured to a base hinge 802, which is secured to the base 110. The base hinge 802 may be the portion of the hinged connection 202 that remains stationary throughout the expansion process. The hinge pulley 806 may be offset from a pivot 804 between the base hinge 802 and the hinge cap 608. In some embodiments, the hinge pulley 806 is configured to route the hinge cable 812 into an interior portion of the arm 106. The pivot 804 may form the hinged connection 202 between the base hinge 802 and the hinge cap 608, such that the hinge cap 608 and the respective arm 106 may rotate about the pivot 804 when moving from the stowed position illustrated in FIG. 8A to the extended position illustrated in FIG. 8B.

In some embodiments, the hinge pulley 806 may include multiple pulleys. For example, the hinge pulley 806 may include multiple pulleys arranges in series with a single hinge cable 812 passing through each of the multiple pulleys and configured to act as a force multiplier. In a series arrangement, the hinge pulleys 806 may include hinge pulleys 806 attached to the base hinge 802 and hinge pulleys 806 attached to the hinge cap 608, such that the hinge cable 812 passing between the hinge pulleys 806 attached to each of the base hinge 802 and the hinge cap 608 may multiply the tensile force in the hinge cable 812 to pull the hinge cap 608 toward the base hinge 802. In another example, the hinge pulley 806 may include multiple pulleys arranged in parallel with multiple hinge cables 812 configured to divide the tensile force across the multiple hinge cables 812.

Tension may be applied to the hinge cable 812 through another component, such as a spool, which may be housed in a drive housing 810. In some embodiments, the distance between the pivot 804 and the hinge pulley 806 may generate a moment (e.g., torque) about the pivot 804 through the applied tension in the hinge cable 812. The moment about the pivot 804 generated by the tension in the hinge cable 812 may cause the arm 106 to rotate about the pivot 804. As the arm 106 rotates about the pivot 804, a length of the hinge cable 812 between the anchor 808 and the hinge pulley 806 may be reduced. The component in the drive housing 810 may continue to apply tension to the hinge cable 812, such as by drawing in excess hinge cable 812 (e.g., onto a spool) accommodating the reduction in length of the hinge cable 812. In other embodiments, the pivot 804 may be driven separately from the hinge cable 812. For example, the pivot 804 may be driven by an actuator and the hinge cable 812 may pass through the arm 106 to drive a separate component, such as a trolley, carrier, roller, etc., as described in further detail below.

The drive housing 810 may include a housing pulley 814 coupled to a bracket 820 (the bracket 820 is not shown in FIG. 8B to show the housing pulley 814, which is hidden from view by the bracket 820 in FIG. 8A). The housing pulley 814 is configured to direct the hinge cable 812 into the drive housing 810. As described in further detail below, the drive housing 810 may include additional components configured to direct the hinge cable 812 and other cables to the appropriate component and in a desired orientation.

In some embodiments, the hinge cap 608 and the base hinge 802 may include latching components that may engage to latch hinge cap 608 to the base hinge 802 when the arm 106 reaches the fully extended position as illustrated in FIG. 8B. The latching components may include a catch 816 disposed in one of the hinge cap 608 or the base hinge 802 and a latch 818 extending from the opposing hinge cap 608 or base hinge 802. For example, the catch 816 may be disposed in the hinge cap 608 on a side of the hinge cap 608 opposite the pivot 804, as illustrated in FIG. 8A. The latch 818 may extend from the base hinge 802 in a complementary location, such that when the arm 106 reaches the extended position, the latch 818 may extend into the catch 816 and secure the side of the hinge cap 608 opposite the pivot 804 to the base hinge 802. When the latch 818 engages with the catch 816, the hinge cap 608 may be secured to the base hinge 802 on opposing sides, such that the hinge cap 608 may be substantially prevented from rotating about the pivot 804, securing the arm 106 in the extended position.

Figure 9A:
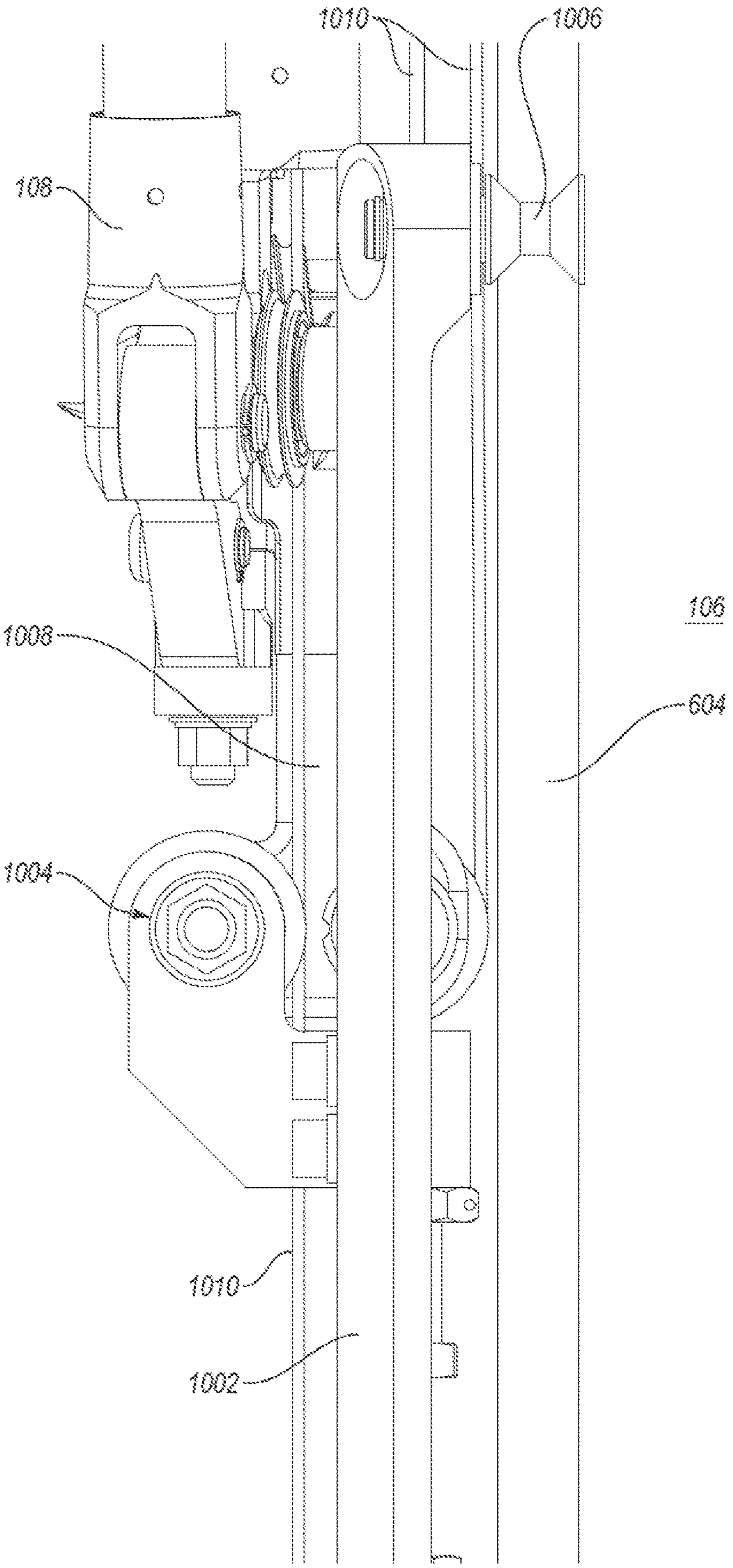
FIGS. 9A through 12B illustrate different views of a carrier coupled to the arm of FIGS. 6 and 7.

FIG. 9A through FIG. 12B illustrate different views of a carrier 1002 coupled to an arm 106. A portion of the expandable structure 108 may be coupled to the arm 106 through the carrier 1002. The carrier 1002 may be coupled to the arm 106 through the rails 604 and may be configured to travel along the rails 604 to transition from one end of the arm 106 to the other. FIG. 9A illustrates an enlarged view of the carrier 1002 and the arm 106 in the stowed configuration and FIG. 9B illustrates the carrier 1002 and the arm 106 in the expanded configuration.

The carrier 1002 may be coupled to the rails 604 though wheels 1006. The wheels 1006 may have a shape substantially complementary to the rails 604 as described in further detail below with respect to FIG. 12B. The wheels 1006 may couple the carrier 1002 to the rails 604 and may facilitate the carrier 1002 traveling along the rails 604. In the stowed configuration illustrated in FIG. 9A, the carrier 1002 may be positioned proximate the proximal end of the arm 106 and in the expanded configuration illustrated in FIG. 9B, the carrier 1002 may be positioned proximate the distal end of the arm 106.

The expandable structure 108 may be coupled to the carrier 1002 through a pivot 1004, such that the expandable structure 108 may remain in substantially a same orientation relative to the tower 104 (FIG. 1-FIG. 4) while the orientation of the arm 106 and carrier 1002 changes relative to the tower 104 (FIG. 1-FIG. 4). For example, in the stowed configuration, the expandable structure 108 may be oriented in a substantially coaxial (e.g., parallel) orientation relative to the tower 104 (FIG. 1-FIG. 4) and the arms 106 may also extend in a direction substantially parallel to the tower 104 (FIG. 1-FIG. 4). As the arms 106 rotate away from the tower 104 (FIG. 1-FIG. 4), an angle between the arms 106 may increase, such that the arms 106 may no longer be oriented parallel to the tower 104 (FIG. 1-FIG. 4). The carrier 1002 may be coupled to the arms 106 such that the angle between the carrier 1002 and the tower 104 (FIG. 1-FIG. 4) is substantially the same as the angle between the arm 106 and the tower 104 (FIG. 1-FIG. 4). The expandable structure 108 may be coupled to the pivot 1004 of the carrier 1002 through a truss arm 1008. The truss arm 1008 may rotate about the pivot 1004 and maintain the expandable structure 108 in a substantially coaxial orientation relative to the tower 104 (FIG. 1-FIG. 4) as the arm 106 rotates away from the tower 104 (FIG. 1-FIG. 4).

The carrier 1002 may include multiple cables 1010 coupled to the carrier 1002. The cables 1010 may be configured to move (e.g., pull) the carrier 1002 to the distal end of arm 106. The cables 1010 may also be configured to expand the expandable structure 108. As described above, some of the cables 1010 may also be configured to cause the arm 106 to rotate about the hinged connection 202 (FIG. 2). In some embodiments, each of the cables 1010 may have a different function. In other embodiments, one or more of the cables 1010 may perform multiple functions. The different arrangements of the cables 1010 are described in further detail below with respect to FIG. 20 through FIG. 23.

Figure 10A:
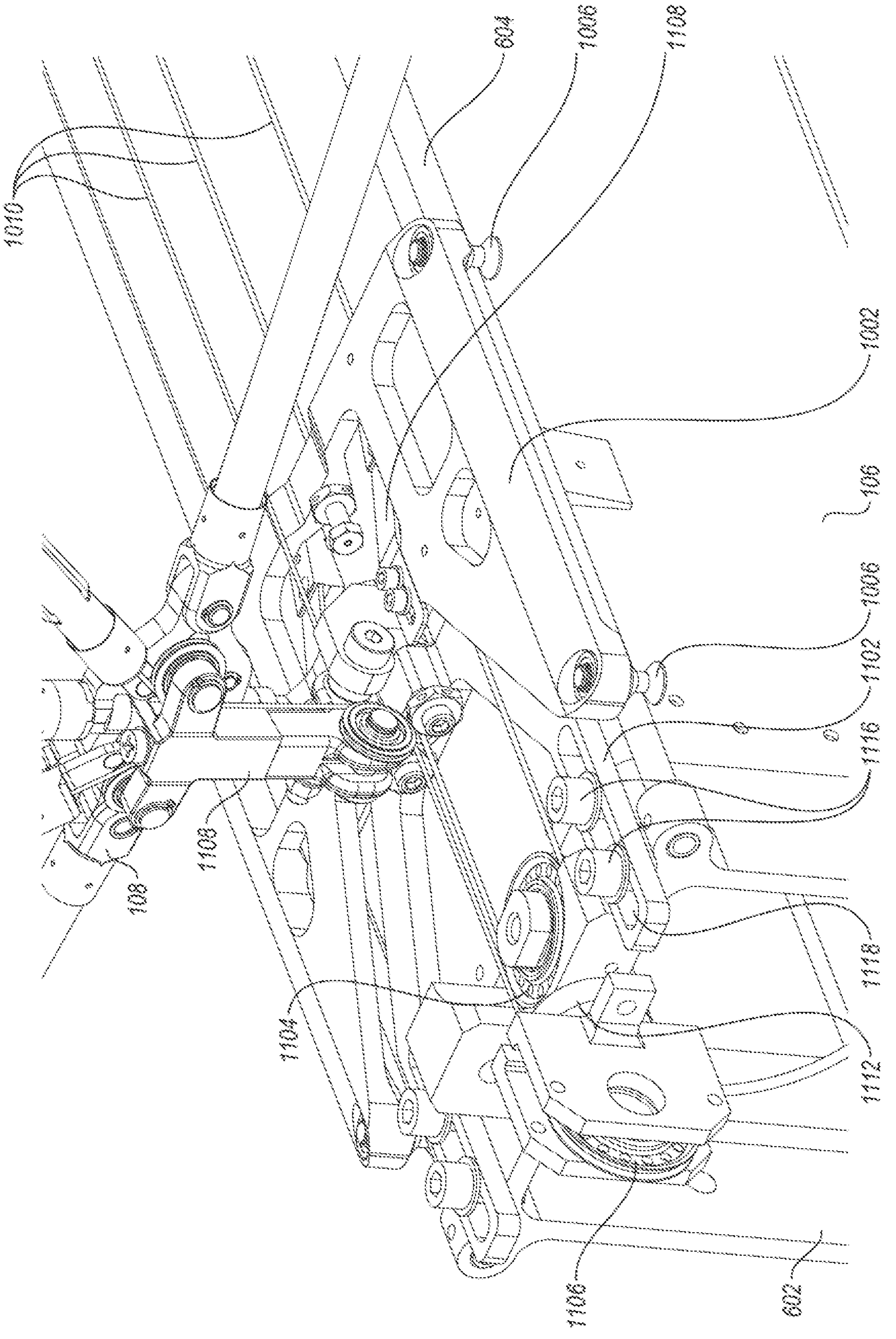
Figure 10B:
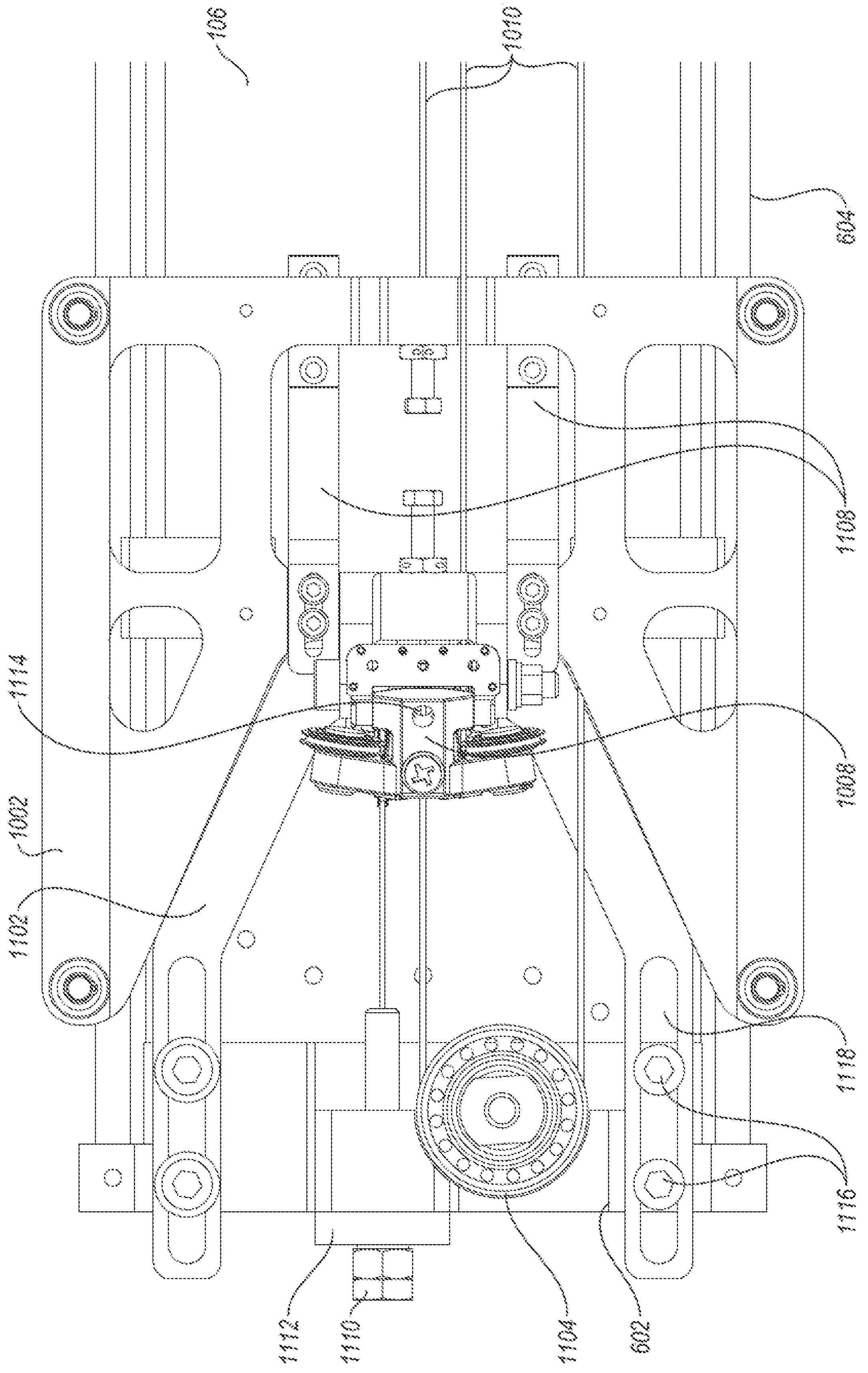

FIG. 10A and FIG. 10B illustrate different views of the carrier 1002 in the extended position at the distal end of the arm 106. The multiple cables 1010 may be coupled to the carrier 1002 in different positions based on a function of the associated cables 1010. For example, in some embodiments, a drive cable may be fixed to the carrier 1002 and may then pass through a pulley 1106 configured to transfer the drive cable into the hollow portion of the arm 106 and back to a component (e.g., spool) in the drive housing 810 (FIG. 8A and FIG. 8B), as illustrated in FIG. 10A. In another embodiment, the drive cable may pass through the carrier 1002 (e.g., through a pulley) and terminate in a fixed location at a cable termination 1110 as illustrated in FIG. 10B, such that the drive cable may have multiple functions, such as acting as a drive cable and a tension cable in the expandable structure 108 as described in further detail in FIG. 20 through FIG. 23. The drive cable may pass through a cable path 1114 defined in the truss arm 1008, such that the drive cable may enter the carrier 1002 from the expandable structure 108. Other cables 1010 may synchronize carriers 1002 on different arms 106. The arm 106 may include additional pulleys 1104 configured to redirect cables 1010 along the arm 106 (e.g., to reverse a direction of the cables 1010).

The arm 106 may include a stop 1102 coupled to the end cap 602. The carrier 1002 may be configured to rest against the stop 1102 when the carrier 1002 is in the fully extended position. The one or more of the cables 1010 (e.g., a drive cable) may be configured to pull the carrier 1002 against the stop 1102. In some embodiments, the one or more cables 1010 may apply an additional force (e.g., a pre-load force) pulling the carrier 1002 against the stop 1102, which may substantially prevent the carrier 1002 from moving down the arm 106 away from the stop 1102. In some embodiments, the one or more cables 1010 may pass through a load washer 1112 coupled between the pulley 1106 and/or the cable termination 1110 coupled to the end cap 602. The load washer 1112 may provide additional tensile forces to the one or more cables 1010. The stop 1102 may be coupled to the end cap 602 with hardware 1116, such as screws, bolts, studs, pins, etc. The hardware 1116 may pass through a slot 1118 in the stop 1102. The slot 1118 may facilitate adjustments to the position of the carrier 1002. For example, the hardware 1116 may be loosened and a position of the stop 1102 may be adjusted. The hardware 1116 may then be tightened to clamp the stop 1102 to the end cap 602.

The carrier 1002 may also include a latch 1108 configured to retain the carrier 1002 in the fully extended position. The latch 1108 may be configured to engage once the carrier 1002 has reached the fully extended position and substantially prevent the carrier 1002 from traveling down the arm 106 in a direction away from the distal end of the arm 106. As illustrated in FIG. 10B, the carrier 1002 may include multiple latches 1108, such as two latches 1108.

Figure 11:
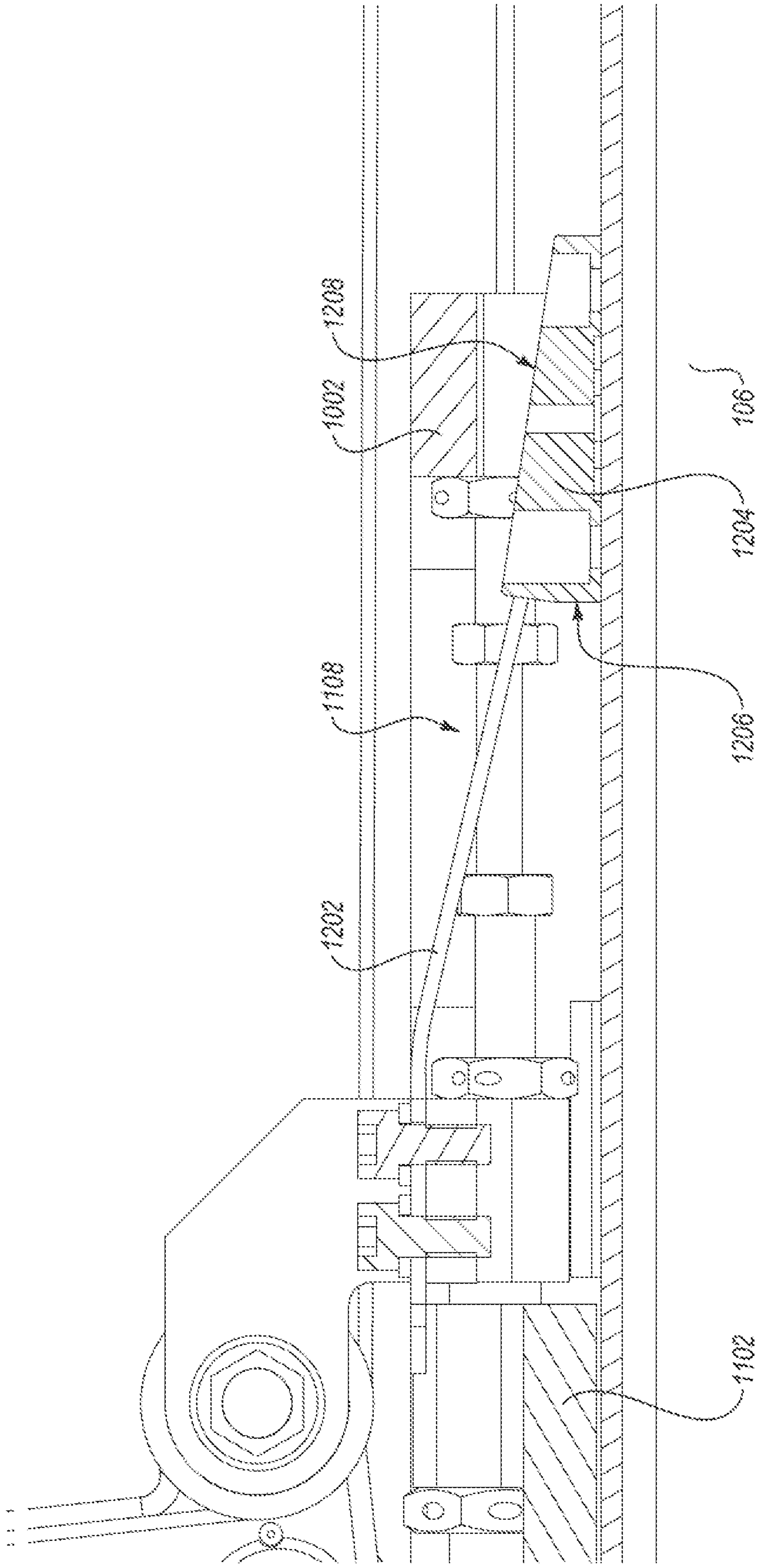

FIG. 11 illustrates an enlarged view of a latch 1108 of the carrier 1002. The latch 1108 may include a movable component 1202 coupled to the carrier 1002, such as a clip, configured to engage a stationary component 1204 coupled to the arm 106, such as a block. The movable component 1202 may be formed from a resilient and elastic material, such as spring steel. The movable component 1202 may be configured to be displaced as the movable component 1202 travels over the stationary component 1204, such as when the carrier 1002 passes over the stationary component 1204, and spring back into position after the movable component 1202 passes the stationary component 1204. An end of the movable component 1202 may then rest against a side surface 1206 of the stationary component 1204, substantially preventing the carrier 1002 from traveling in an opposite direction along the arm 106.

In some embodiments, the stationary component 1204 may have a wedge shape. For example, a top surface 1208 of the stationary component 1204 may form an inclined plane relative to the arm 106. The top surface 1208 may include multiple ridges or teeth, which may be configured to act as a ratcheting interface, such that once the movable component 1202 passes over the top surface 1208 the movable component 1202 may be substantially prevented from reversing direction. The movable component 1202 may extend from the carrier 1002 at a downward angle away from the direction of travel. The angle of the movable component 1202 may facilitate the movable component 1202 moving away from the arm 106 under the influence of the top surface 1208 of the stationary component 1204 when the carrier 1002 moves toward the distal end of the arm 106 while catching against the side surface 1206 and/or the ridges or teeth in the top surface 1208 when the carrier 1002 attempts to move in an opposite direction away from the distal end of the arm 106.

Figure 12A:
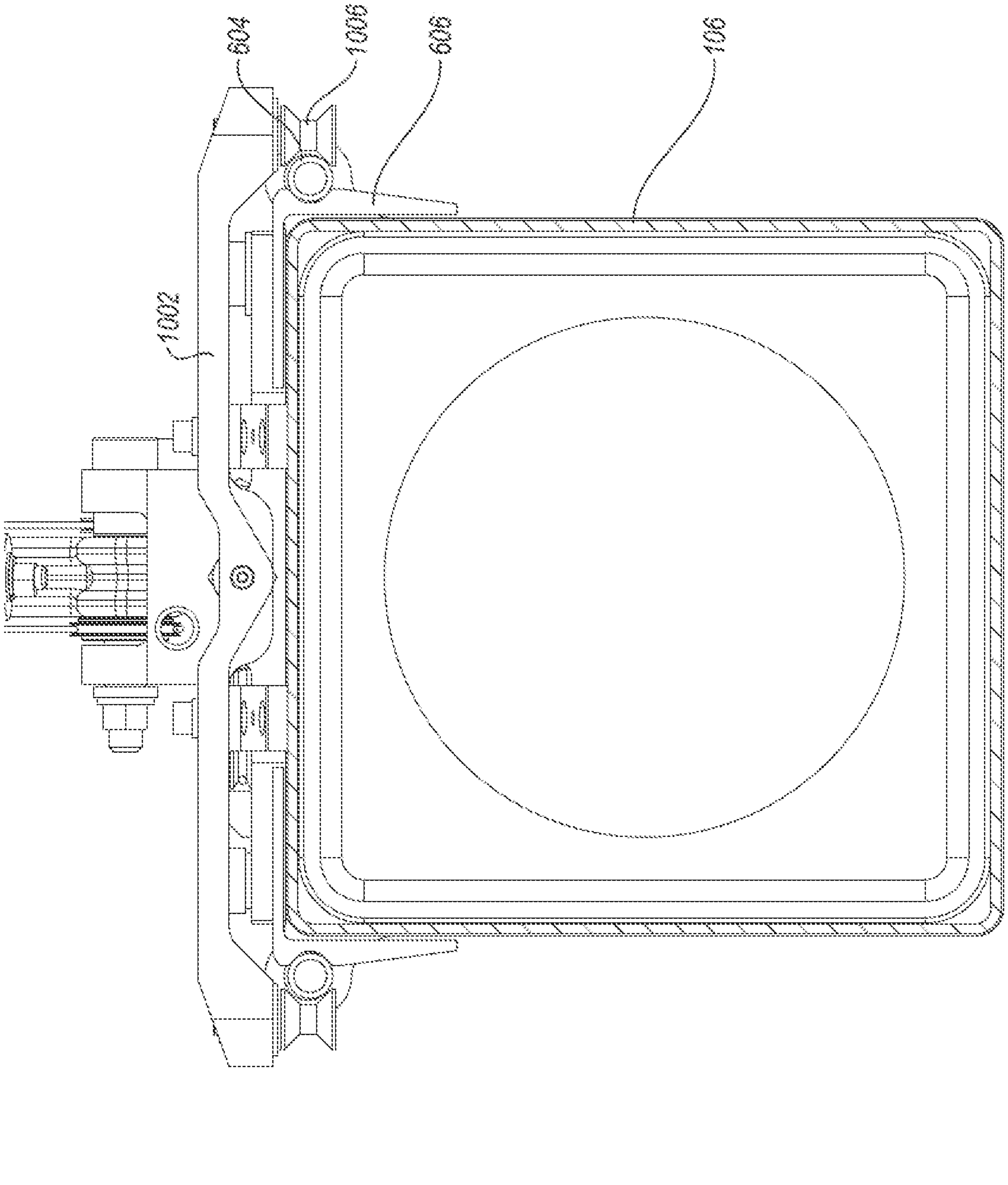
Figure 12B:
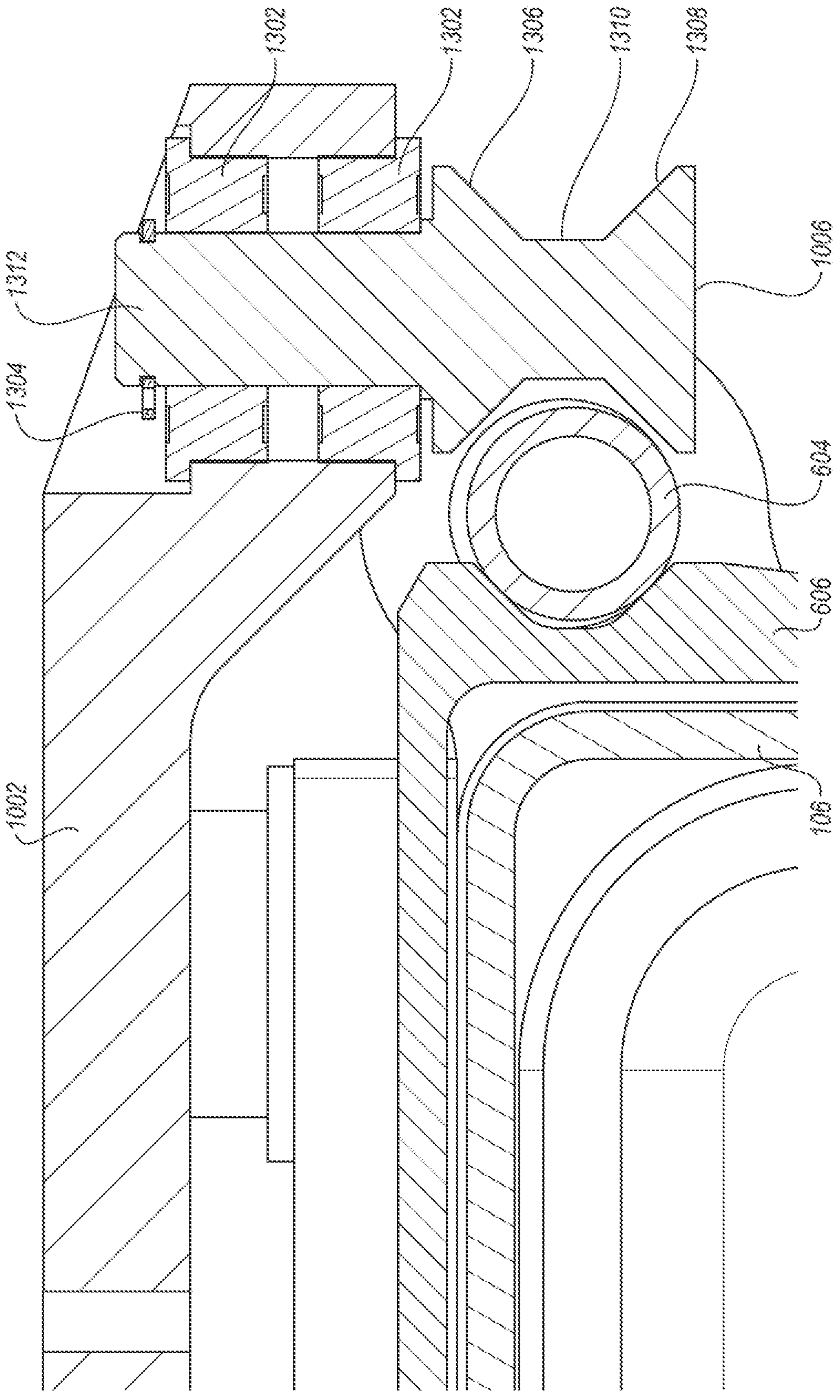

FIG. 12A and FIG. 12B illustrate different views of the carrier 1002 interface with the rails 604 coupled to the arm 106. As described above, the carrier 1002 may include multiple wheels 1006 configured to secure the carrier 1002 to the rails 604. The wheels 1006 may include complementary geometry to the rails 604. For example, the wheels 1006 may include a first retaining surface 1306 and a second retaining surface 1308. The retaining surfaces 1306, 1308 may define a valley 1310 between the first retaining surface 1306 and the second retaining surface 1308. Each of the first retaining surface 1306, second retaining surface 1308, and valley 1310 may contact the rail 604. In some embodiments, the retaining surfaces 1306, 1308 may be conical surfaces as illustrated in FIG. 12A and FIG. 12B, such that the retaining surfaces 1306, 1308 define substantially straight contact surfaces. In other embodiments, the retaining surfaces 1306, 1308 may define rounded contact surfaces, such as parabolic contact surfaces, circular contact surfaces, etc. For example, the retaining surfaces 1306, 1308 and the valley 1310 may form a hyperboloid.

Each wheel 1006 may be coupled to the carrier 1002 through one or more bearings 1302. The bearings 1302 may facilitate substantially free rotation of the wheels 1006 relative to the carrier 1002. The wheels 1006 may also include a retaining element 1304 extending from a shaft 1312 of the wheel 1006. The retaining element 1304 may extend to a greater radius than the passage defined by the bearings 1302 through which the shaft 1312 of the wheel 1006 passes. The retaining element 1304 may be configured to substantially prevent the shaft 1312 from being removed through the bearings 1302. In some embodiments, the shaft 1312 may be a pin extending through the shaft 1312. In other embodiments, the retaining element 1304 may be an element configured to extend from the shaft 1312 in more than two directions, such as a disk, cone, or other element.

Figure 13A:
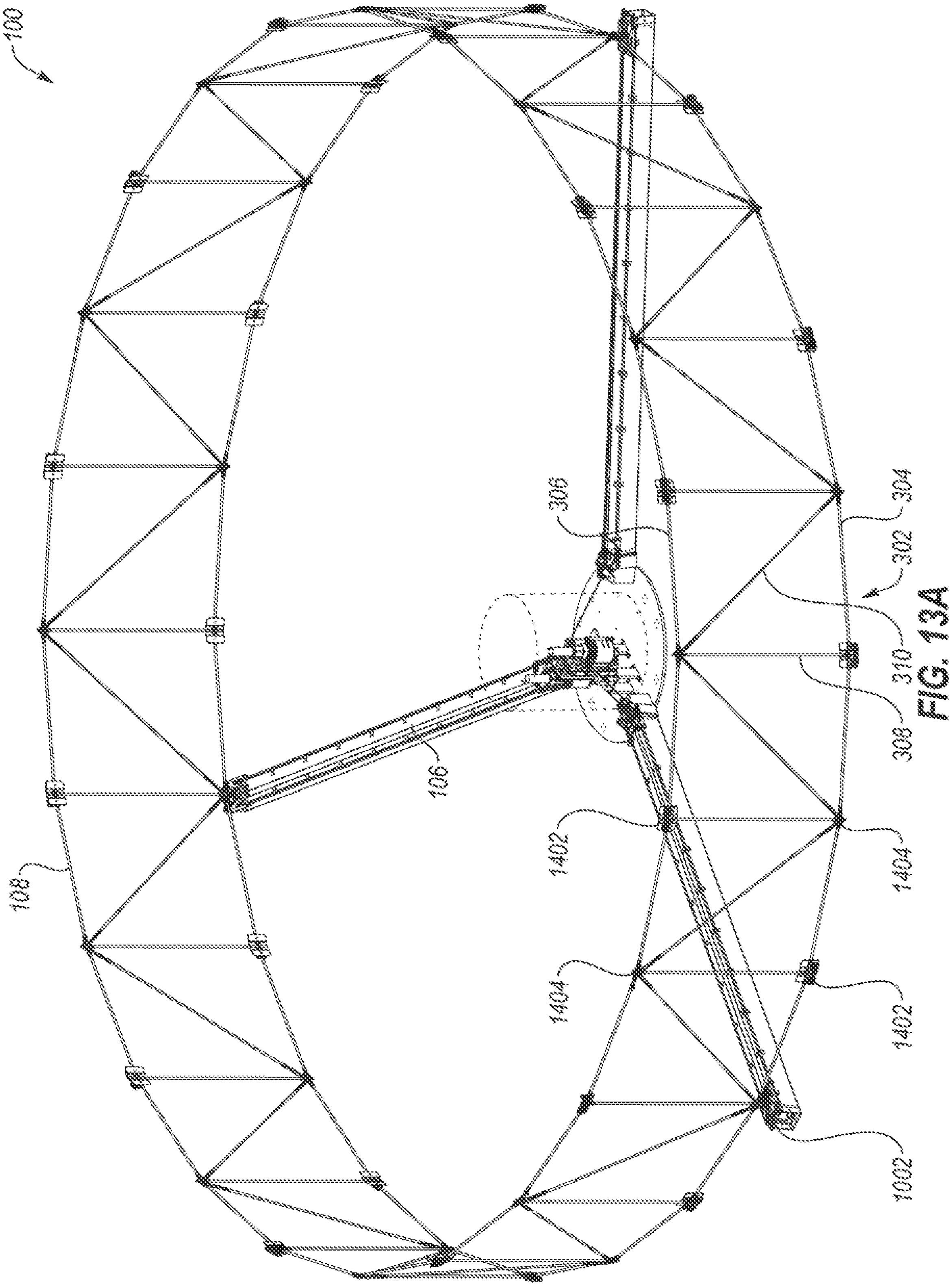
FIGS. 13A and 13B illustrate perspective views of the expandable structure of the antenna structure of FIGS. 1 through 5.
Figure 13B:
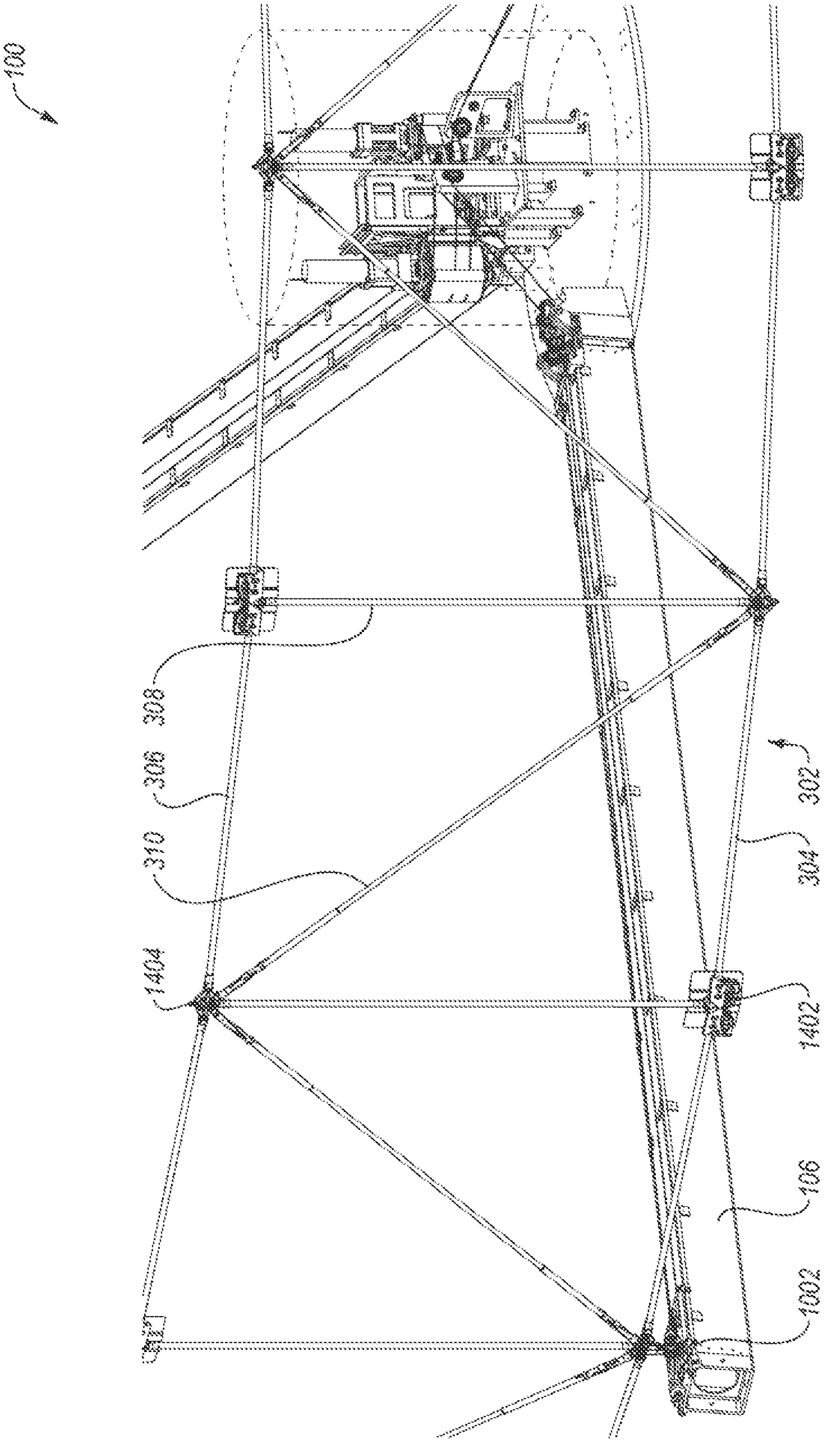
Figure 14A:
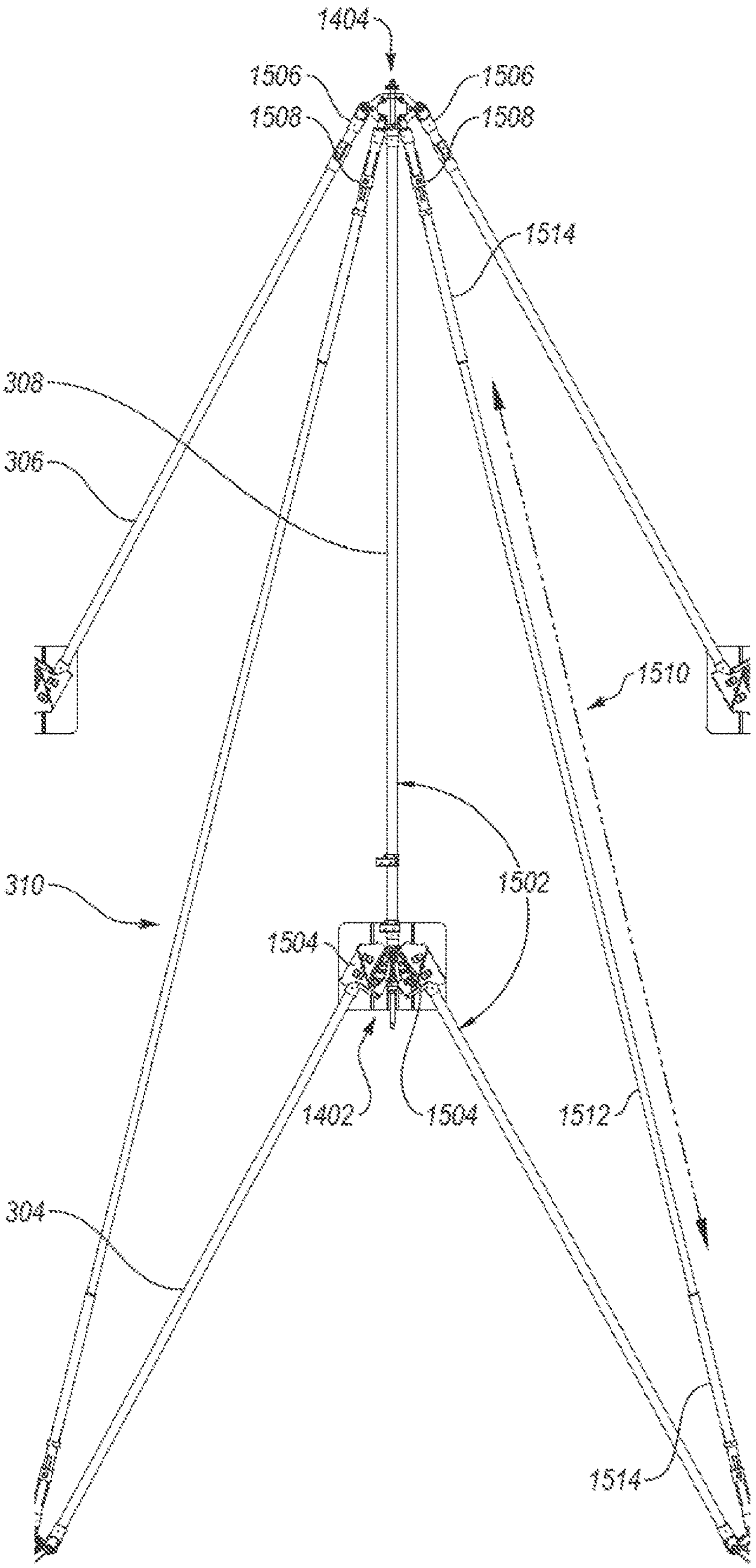
FIGS. 14A and 14B illustrate enlarged views of a segment of the expandable structure of FIGS. 13A and 13B in different configurations.
Figure 14B:
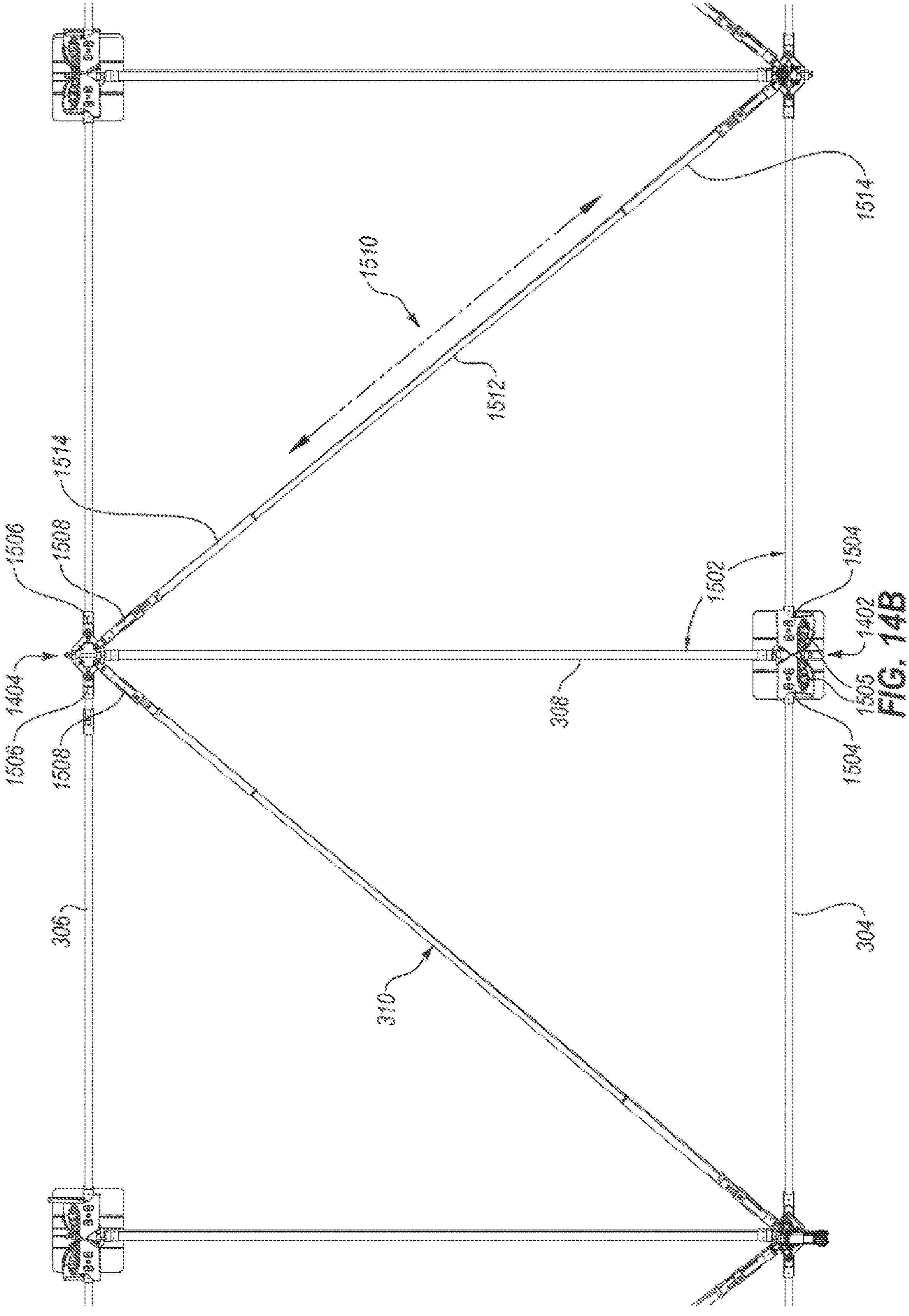
Figure 15:
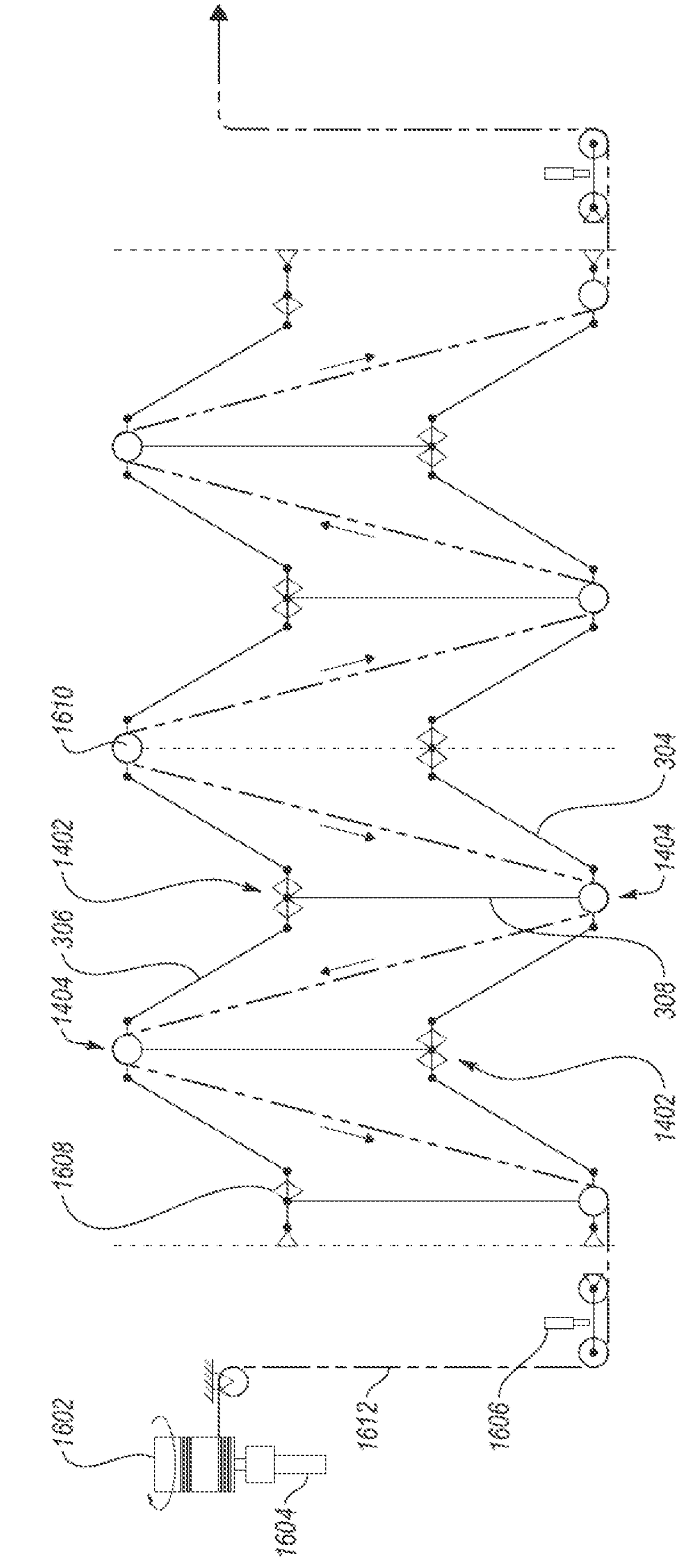
FIG. 15 illustrates a schematic view of a section of the expandable structure of FIGS. 13A and 13B.

FIG. 13A through FIG. 15 illustrate different views of the expandable structure 108. FIG. 13A illustrates the entire expandable structure 108 in an expanded configuration. FIG. 13B illustrates an enlarged view of a portion of the expandable structure 108 in the expanded configuration. FIG. 14A illustrates an enlarged view of a segment 302 of the expandable structure 108 before reaching the expanded configuration and FIG. 14B illustrates an enlarged view of the segment 302 of the expandable structure 108 in the expanded configuration. FIG. 15 illustrates a schematic view of the expandable structure 108.

As described above, the expandable structure 108 may be a truss-like structure including multiple segments 302 formed from two sets of parallel structures, such as rods, pins, shafts, etc. The two sets of parallel structures may include parallel truss members 304, 306 (e.g., a bottom truss member 304 and a top truss member 306) and parallel vertical truss members 308. Each of the vertical truss members 308 may have substantially the same length and each of the bottom truss members 304 may have substantially the same length as the corresponding top truss members 306. Thus, each segment 302 may form a parallelogram. Each segment 302 may also include a diagonal truss structure 310 extending diagonally between two corners of the segment 302, such as between a corner between the top truss member 306 and the vertical truss member 308 and a corner between the bottom truss member 304 and an adjacent vertical truss member 308. The diagonal truss structure 310 may be configured to change in length such that a shape of the segment 302 may change during deployment until each of the corners form angles of about 90°. When each of the corners form angles of about 90°, the expandable structure 108 may be at its largest diameter as illustrated in FIG. 13A and FIG. 13B.

The structures of the expandable structure 108 may be joined at each vertical truss member 308 by a valley node 1402 or a ridge node 1404. The valley node 1402 may be configured to receive three elements, such as two truss members 304, 306 (e.g., two top truss members 306 or two bottom truss members 304) and a vertical truss member 308. The ridge node 1404 may be configured to receive five elements, such as two truss members 304, 306 (e.g., two top truss members 306 or two bottom truss members 304), two diagonal truss structures 310, and a vertical truss member 308. Each vertical truss member 308 may have a valley node 1402 on a first end of the vertical truss member 308 and a ridge node 1404 on a second end of the vertical truss member 308 opposite the first end. Similarly, each bottom truss member 304 and each top truss member 306 may extend between a valley node 1402 and a ridge node 1404. The valley nodes 1402 and ridge nodes 1404 may alternate sides (e.g., top side and bottom side) of the expandable structure 108 at each vertical truss member 308. The alternating position of the valley nodes 1402 and the ridge nodes 1404 may facilitate the diagonal truss structures 310 alternating between top and bottom of the expandable structure 108 at each vertical truss member 308.

As described above, the expandable structure 108 may be coupled to the carriers 1002 on each arm 106. Each carrier 1002 may be coupled to the expandable structure 108 through one of the ridge nodes 1404. This may facilitate cables passing from the carriers 1002 into the diagonal truss structures 310 as described in further detail below. The carriers 1002 may move (e.g., pull) the associated ridge nodes 1404 to the distal end of the associated arms 106. The distal end of the associated arms 106 may define an outer circumference of the expandable structure 108. For example, the distal end of each arm 106 may be a distance from the center of the antenna 100 that is substantially equal to the radius of the expandable structure 108 in its fully extended form.

The valley nodes 1402 and the ridge nodes 1404 may include fittings 1504, 1506, 1508, which may be configured to rotate relative to the valley nodes 1402 and the ridge nodes 1404, to facilitate the expansion of the expandable structure 108. For example, the valley nodes 1402 and the ridge nodes 1404 may be fixed relative to the associated vertical truss member 308. The fittings 1504, 1506, 1508 may facilitate the rotation of the associated truss members 304, 306 and diagonal truss structures 310 relative to the vertical truss members 308. In a fully retracted position the truss members 304, 306 and the diagonal truss structures 310 may be substantially parallel to the vertical truss members 308. As the carriers 1002 travel along the respective arms 106, an angle 1502 between the truss members 304, 306 and the vertical truss member 308 may be reduced as the expandable structure 108 approaches the expanded position. For example, in the fully retracted position, the angle 1502 may be about 180°, such as greater than about 1600 or greater than about 170°. In a fully expanded position, the angle 1502 may be about 90°, such as between about 800 and about 100°, or between about 850 and about 95°.

The valley nodes 1402 may include two fittings 1504, which may be configured to couple to the adjacent truss members 304, 306. For example, if the valley node 1402 is positioned on a bottom side of the associated vertical truss member 308, the fittings 1504 may be coupled to the two adjacent bottom truss members 304, as illustrated in FIG. 14A and FIG. 14B. The fittings 1504 may include synchronizer gears 1505 configured to synchronize the movement (e.g., rotation) of the fittings 1504. The ridge nodes 1404 may include four fittings 1506, 1508. The four fittings may include two chord fittings 1506 and two diagonal fittings 1508. The two chord fittings 1506 may be the outer two fittings of the ridge nodes 1404. The chord fittings 1506 may be coupled to the adjacent truss members 304, 306. For example, if the ridge node 1404 is positioned on a top side of the associated vertical truss member 308, the chord fittings 1506 may be coupled to the two adjacent top truss members 306, as illustrated in FIG. 14A and FIG. 14B. The diagonal fittings 1508 may be positioned between the chord fittings 1506 and the vertical truss member 308 on opposite sides of the vertical truss member 308. The diagonal fittings 1508 may be coupled to the diagonal truss structures 310.

As described above, the diagonal truss structures 310 may be configured to change length to change the angle 1502 between the truss members 304, 306 and the vertical truss member 308. For example, the diagonal 310 may be a telescoping element, such as several nested tubes configured to expand or retract. In the embodiment illustrated in FIGS. 15A and 15B, the diagonal truss structure 310 includes an inner diagonal tube 1512 nested within outer diagonal tubes 1514 coupled to the diagonal fittings 1508. A cable may pass through the inner diagonal tube and the outer diagonal tubes 1514. The cable may be configured to draw the inner diagonal tube 1512 at least partially into the outer diagonal tubes 1514 when the cable is drawn onto a spool, decreasing a length of the diagonal truss structure 310. In some embodiments, one or more of the diagonal fittings 1508 and/or the outer diagonal tubes 1514 may include a ratcheting mechanism (not shown) configured to prevent the diagonal truss structures 310 from increasing in length during deployment, such that the length of the diagonal truss structure 310 may be limited to decreasing in length during deployment. In other embodiments, the diagonal truss structure 310 may be a cable extending between the two diagonal fittings 1508 and the length 1510 of the cable extending between the two diagonal fittings 1508 to form the diagonal truss structure 310 may change as the cable is retracted into a spool 1602, as illustrated in FIG. 15.

In some cases, the expandable structure 108 may be operably divided into sections 1614. For example, the sections 1614 may be separated at each arm 106, such that each section 1614 extends between two adjacent arms 106. Each section 1614 may have a cable 1612 passing through each of the diagonal truss structures 310 in the section 1614. The cable 1612 may be terminated on a first end of the section 1614 and may be coupled to a spool 1602 on a second end opposite the first end. Thus, as the cable 1612 is wound onto the spool 1602, such as by a motor 1604 turning the spool 1602, each of the diagonal truss structures 310 in the section 1614 may shorten by substantially a same amount. The cable 1612 may pass through pulleys 1610 at each of the ridge nodes 1404, which may reduce friction where the direction of the cable 1612 changes direction, which may facilitate a balanced tensile force through the cable 1612 throughout the section 1614.

In some cases, the section 1614 may be operably coupled to an adjacent section 1614, such as through a synchronizing mechanism 1608, which may synchronize the two sections 1614. Synchronizing the two sections 1614 may facilitate opening each section 1614 of the expandable structure 108 at substantially a same rate, such that the expandable structure 108 expands in a substantially uniform manner. In some embodiments, the synchronizing mechanism 1608 may be a synchronizing cable. In other embodiments, the synchronizing mechanism 1608 may be a mechanical connection, such as interlocking gears or teeth. For example, the fittings 1504 on the valley node 1402 coupling to sections 1614 together may include a geared interface, such that the two fittings 1504 rotate at substantially the same rate.

In some embodiments, the expandable structure 108 may include one or more sensors 1606, such as end switches, position sensors (e.g., potentiometers, displacement sensors, Hall Effect sensor, etc.), pressure sensors, strain sensors, etc. The sensors 1606 may provide information to a controller, which may make decisions and/or change control commands based on readings from the one or more sensors 1606.

Figure 16:
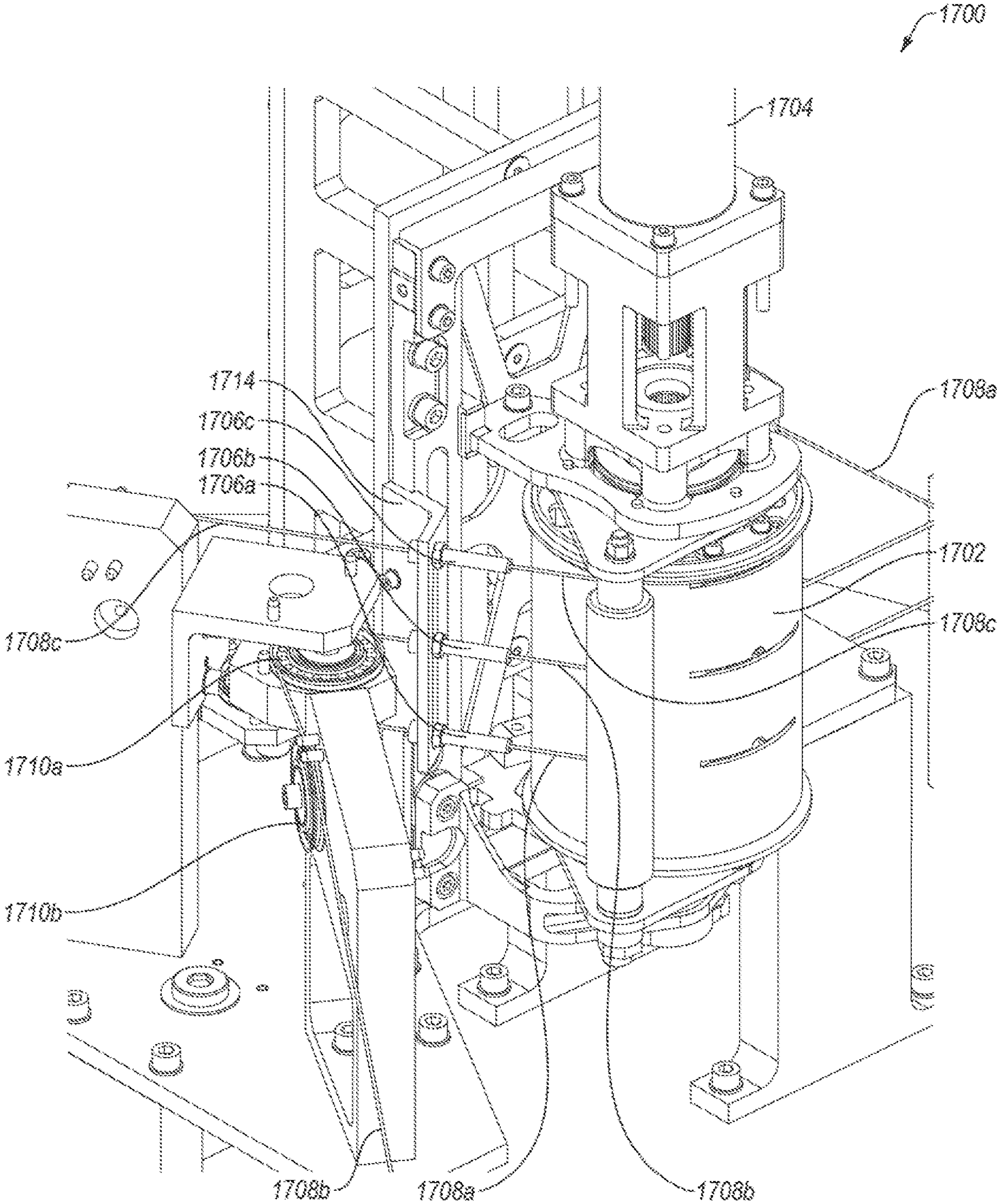
FIGS. 16 through 18 illustrate different views of a drive of the antenna structure of FIGS. 1 through 5.
Figure 17:
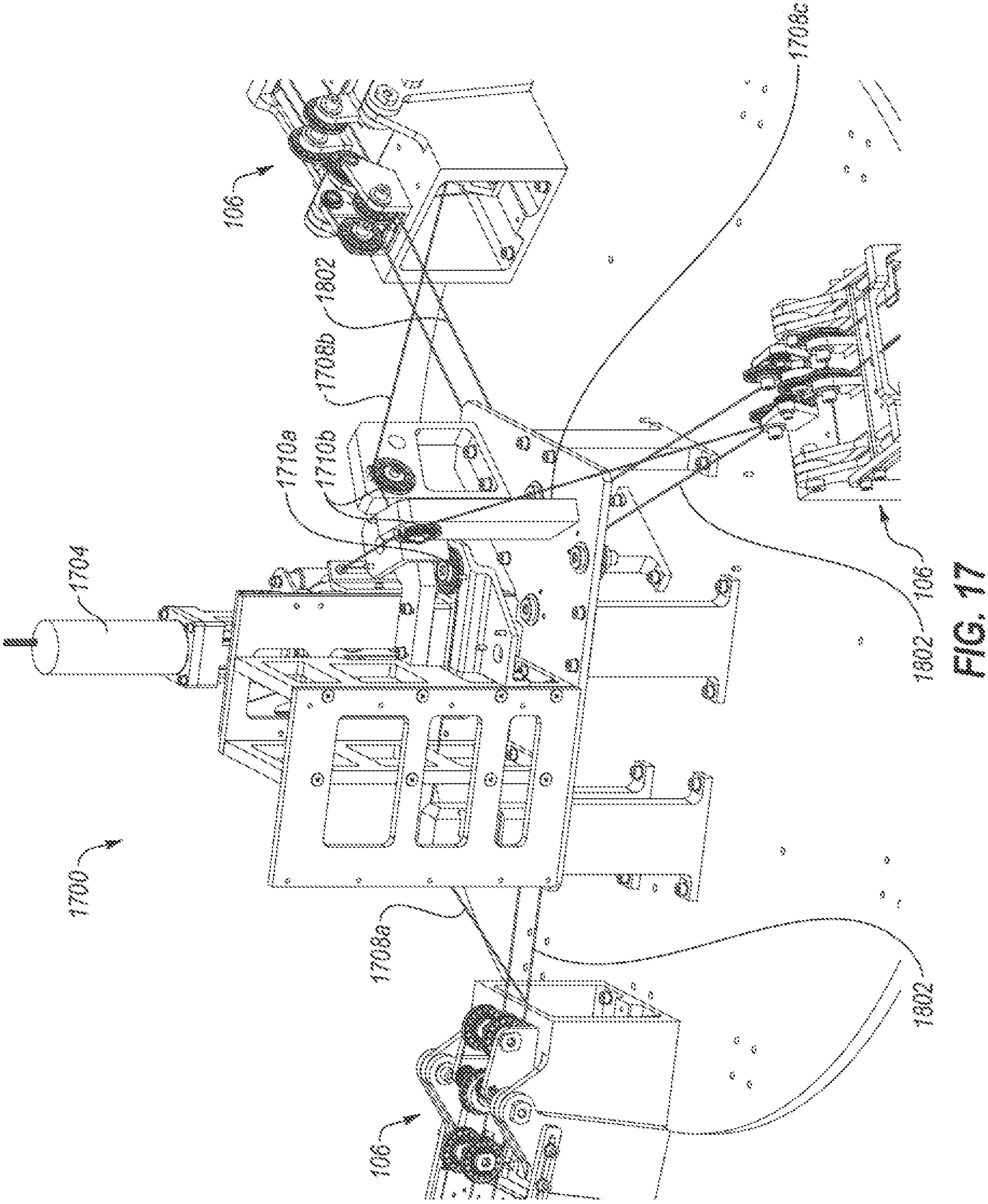
Figure 18:
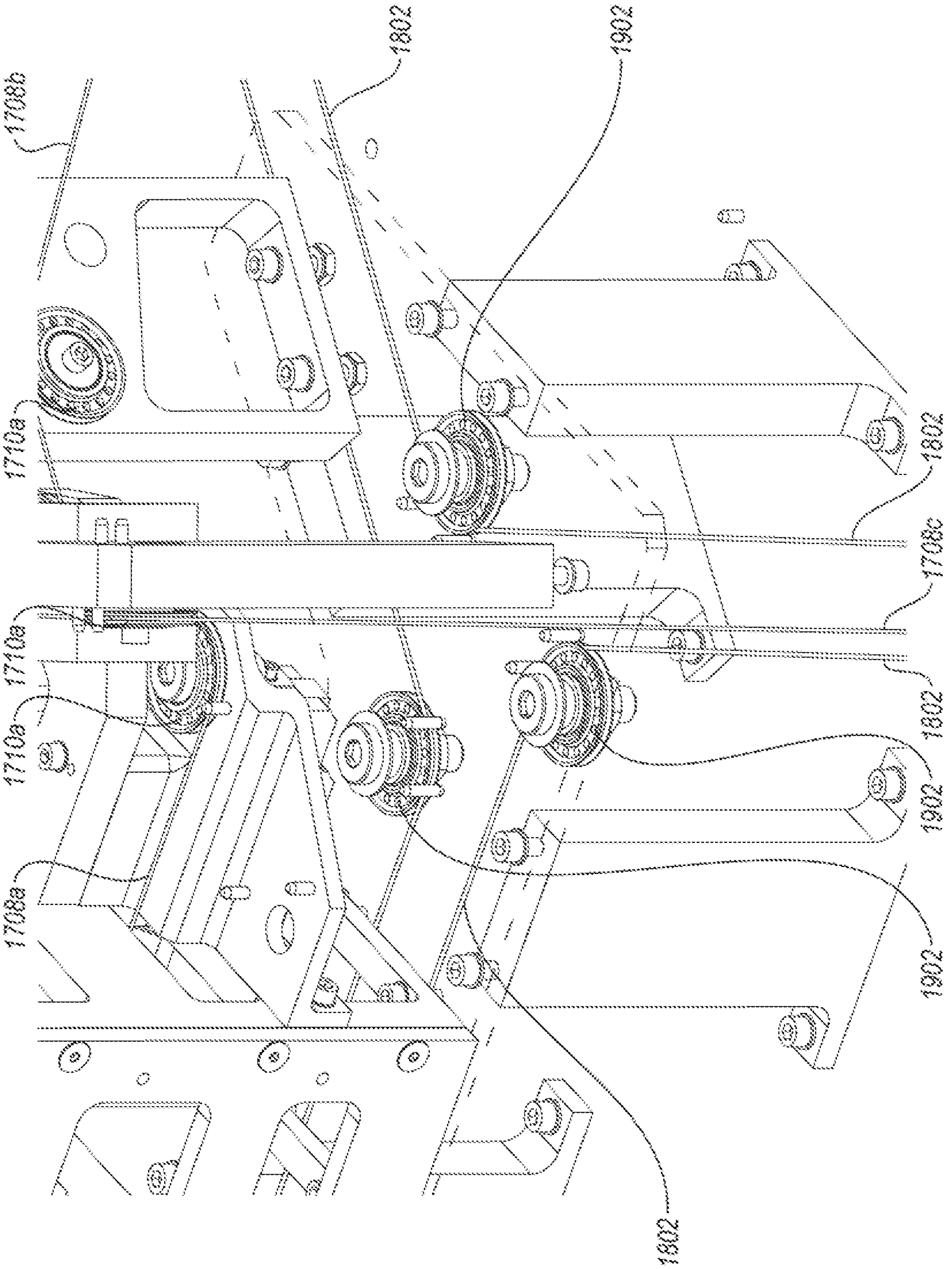

FIG. 16 through FIG. 18 illustrate different views of a drive 1700. The drive 1700 may be housed in a drive housing 810 (FIG. 8A) in a central portion of the antenna 100 (FIG. 1 through FIG. 5). The drive 1700 may include a spool 1702 (e.g., spool 1602) coupled to a motor 1704 (e.g., motor 1604). The motor 1704 may be configured to rotate the spool 1702. The spool 1702 may be coupled to one or more drive cables 1708*a*, 1708*b*, 1708*c*. As the motor 1704 rotates the spool 1702, the one or more drive cables 1708*a*, 1708*b*, 1708*c* may wind onto the spool 1702, such that the spool 1702 may reduce a length of the associated drive cables 1708*a*, 1708*b*, 1708*c* between the spool 1702 and a termination point.

As illustrated in FIG. 16, the spool 1702 may be configured to receive multiple drive cables 1708*a*, 1708*b*, 1708*c*. Each of the drive cables 1708*a*, 1708*b*, 1708*c* may be configured to drive a section (e.g., section 1614 (FIG. 15))

of the expandable structure 108 (FIG. 13A). Each drive cable 1708*a*, 1708*b*, 1708*c* may be configured to travel down a respective arm 106 to interface with the respective components. For example, the drive cables 1708*a*, 1708*b*, 1708*c* may be configured to pull a carrier 1002 (FIG. 9A) down the respective arm 106 to the distal end of the respective arm 106. In some embodiments, the drive cables 1708*a*, 1708*b*, 1708*c* may be configured to shorten the length 1510 (FIG. 14A, FIG. 14B) of the diagonal truss structures 310 in the respective sections 1614 (FIG. 15) of the expandable structure 108 (FIG. 13A). In some embodiments, the drive cables 1708*a*, 1708*b*, 1708*c* may be configured to cause the respective arms 106 to rotate away from the base 110 (FIG. 8A, FIG. 8B). In some examples, the drive cables 1708*a*, 1708*b*, 1708*c* may perform multiple functions. Exemplary routing and functions are described in further detail below with respect to FIG. 20 through FIG. 23.

The drive cables 1708*a*, 1708*b*, 1708*c* may be directed to different portions of the spool 1702 through cable nozzles 1706*a*, 1706*b*, 1706*c*. For example, a first cable nozzle 1706*a* may direct a first drive cable 1708*a* to a bottom portion of the spool 1702, a second cable nozzle 1706*b* may direct a second drive cable 1708*b* to a center portion of the spool 1702, and a third cable nozzle 1706*c* may direct a third drive cable 1708*c* to a top portion of the spool 1702. This may facilitate the multiple drive cables 1708*a*, 1708*b*, 1708*c* being wound onto the spool 1702 without interfering with adjacent drive cables 1708*a*, 1708*b*, 1708*c*. The cable nozzles 1706*a*, 1706*b*, 1706*c* may be secured to a nozzle carrier 1714, which may maintain a uniform spacing between the cable nozzles 1706*a*, 1706*b*, 1706*c*. The nozzle carrier 1714 may be configured to move relative to the spool 1702 in an axial direction. For example, the nozzle carrier 1714 may be configured to substantially prevent the drive cables 1708*a*, 1708*b*, 1708*c* from overlapping on the spool 1702 by moving axially up or down the spool 1702 as the spool 1702 rotates, such that the drive cables 1708*a*, 1708*b*, 1708*c* are spooled in a helical manner up or down the spool 1702.

The spool 1702 may include a guide roller 1712 configured to maintain the drive cables 1708*a*, 1708*b*, 1708*c* in contact with the surface of the spool 1702. The guide roller 1712 may further assist the cable nozzles 1706*a*, 1706*b*, 1706*c* in guiding the drive cables 1708*a*, 1708*b*, 1708*c* onto the spool 1702 by restricting the drive cables 1708*a*, 1708*b*, 1708*c* from overlapping one another.

The drive cables 1708*a*, 1708*b*, 1708*c* may be guided into the cable nozzles 1706*a*, 1706*b*, 1706*c* through one or more pulleys 1710*a*, 1710*b*. For example, FIG. 16 illustrates a vertical pulley 1710*b* and a horizontal pulley 1710*a* associated with the second drive cable 1708*b*. The vertical pulley 1710*b* may elevate the second drive cable 1708*b* to a vertical level of the second cable nozzle 1706*b* and the horizontal pulley 1710*a* may redirect the second drive cable 1708*b* to the second cable nozzle 1706*b* in the horizontal plane. In some cases, as illustrated in FIG. 17, a drive cable 1708*a*, 1708*b*, 1708*c* may only include a vertical pulley 1710*b*. For example, the third drive cable 1708*c* may be substantially horizontally aligned with the third cable nozzle 1706*c*, such that the third drive cable 1708*c* may pass over a vertical pulley 1710*b* and then into the third cable nozzle 1706*c* without passing through a horizontal pulley 1710*a*.

The drive 1700 may also receive synchronizing cables 1802. The synchronizing cables 1802 may run between the different sections (e.g., sections 1614 (FIG. 15) of the expandable structure 108 (FIG. 13A)). For example, the synchronizing cables 1802 may act as the synchronizing mechanism 1608 (FIG. 15) described above. The synchronizing cables 1802 may be redirected within the drive 1700 by one or more synchronizing pulleys 1902. For example, the synchronizing cables 1802 may be directed from one arm 106 to another adjacent arm 106 by a synchronizing pulley 1902 in the drive 1700. In some embodiments, the synchronizing cables 1802 may couple the carriers 1002 (FIG. 9A, FIG. 9B) to each other, such that position of the carriers 1002 (FIG. 9A, FIG. 9B) along each respective arm 106 may be synchronized through the synchronizing cable 1802.

Figure 19A:
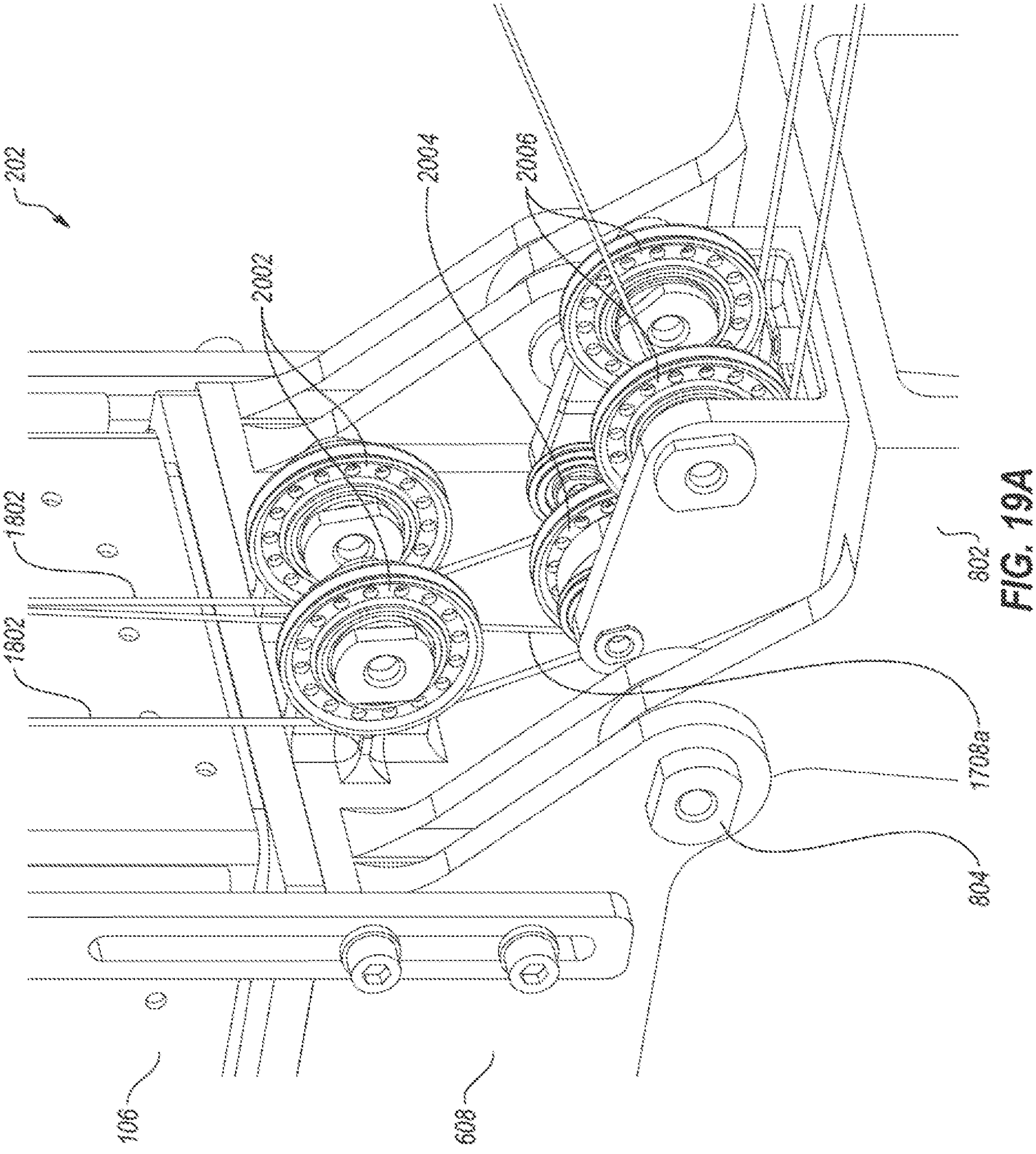
FIGS. 19A and 19B illustrate enlarged views of the hinged connection of the antenna structure of FIGS. 1 through 5.
Figure 19B:
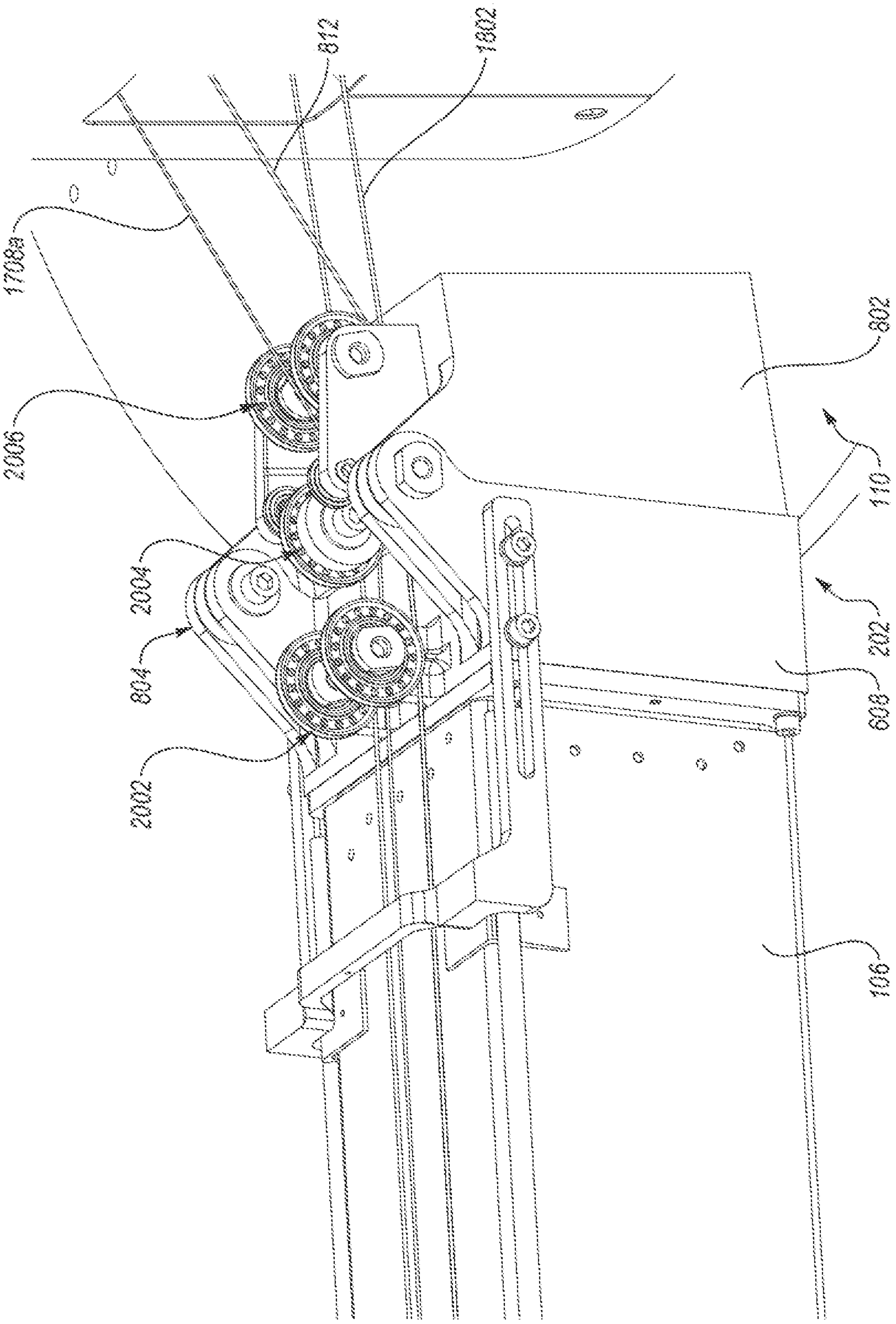

FIG. 19A and FIG. 19B illustrate the hinged connection 202 in a stowed (e.g., retracted) position (FIG. 19A) and an expanded (e.g., deployed) position (FIG. 19B). The hinged connection 202 may include multiple pulleys configured to interface with the drive cables 1708*a*, 1708*b*, 1708*c* and the synchronizing cables 1802. In FIG. 19A and FIG. 19B a first arm 106 and the interface between the first drive cable 1708*a* and the synchronizing cable 1802 and the first arm 106 is illustrated. The interface between each of the arms 106 and the respective drive cables 1708*a*, 1708*b*, 1708*c* and synchronizing cables 1802 may be substantially the same as the interface illustrated in FIG. 19A and FIG. 19B.

Figure 9B:
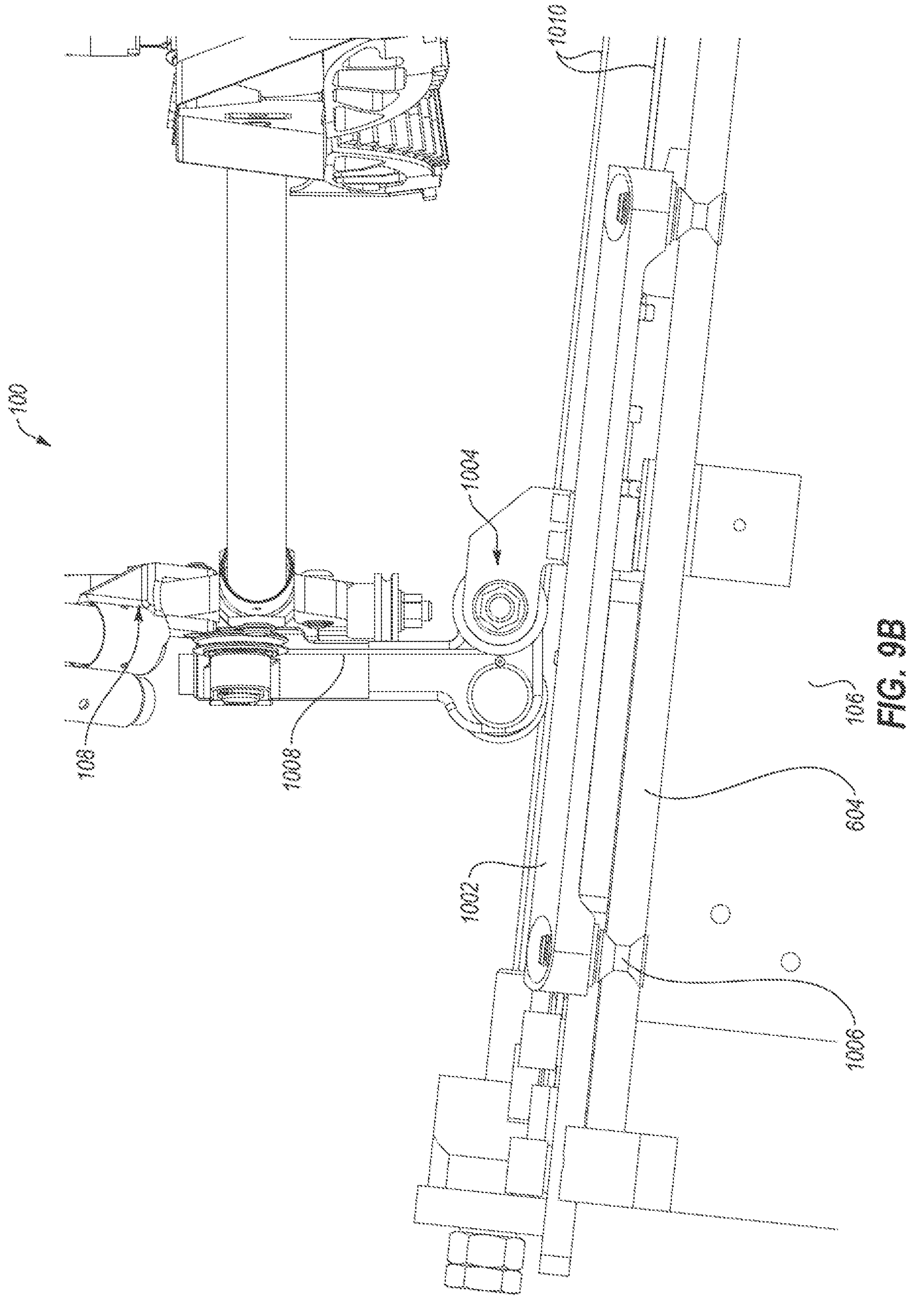

The drive cable 1708*a* may pass through a drive pulley 2004, which may direct the drive cable 1708*a* up the arm 106 to the carrier 1002 (FIG. 9A, FIG. 9B). The drive pulley 2004 may be substantially coaxial with the pivot 804 of the hinged connection 202, such that the drive cable 1708*a* leaving the drive pulley 2004 may remain substantially parallel with the arm 106.

The synchronizing cable 1802 may pass through multiple synchronizing pulleys 2002, 2006. The synchronizing pulleys 2002, 2006 may include arm synchronizing pulleys 2002 and base synchronizing pulleys 2006. The synchronizing cable 1802 may pass through a base synchronizing pulley 2006 to an arm synchronizing pulley 2002 down the arm 106 to the carrier 1002 (FIG. 9A, FIG. 9B) and back down the arm 106 to a second arm synchronizing pulley 2002 and then to a second base synchronizing pulley 2006 before passing through a synchronizing pulley 1902 (FIG. 18) in the drive 1700 (FIG. 18).

Figure 20:
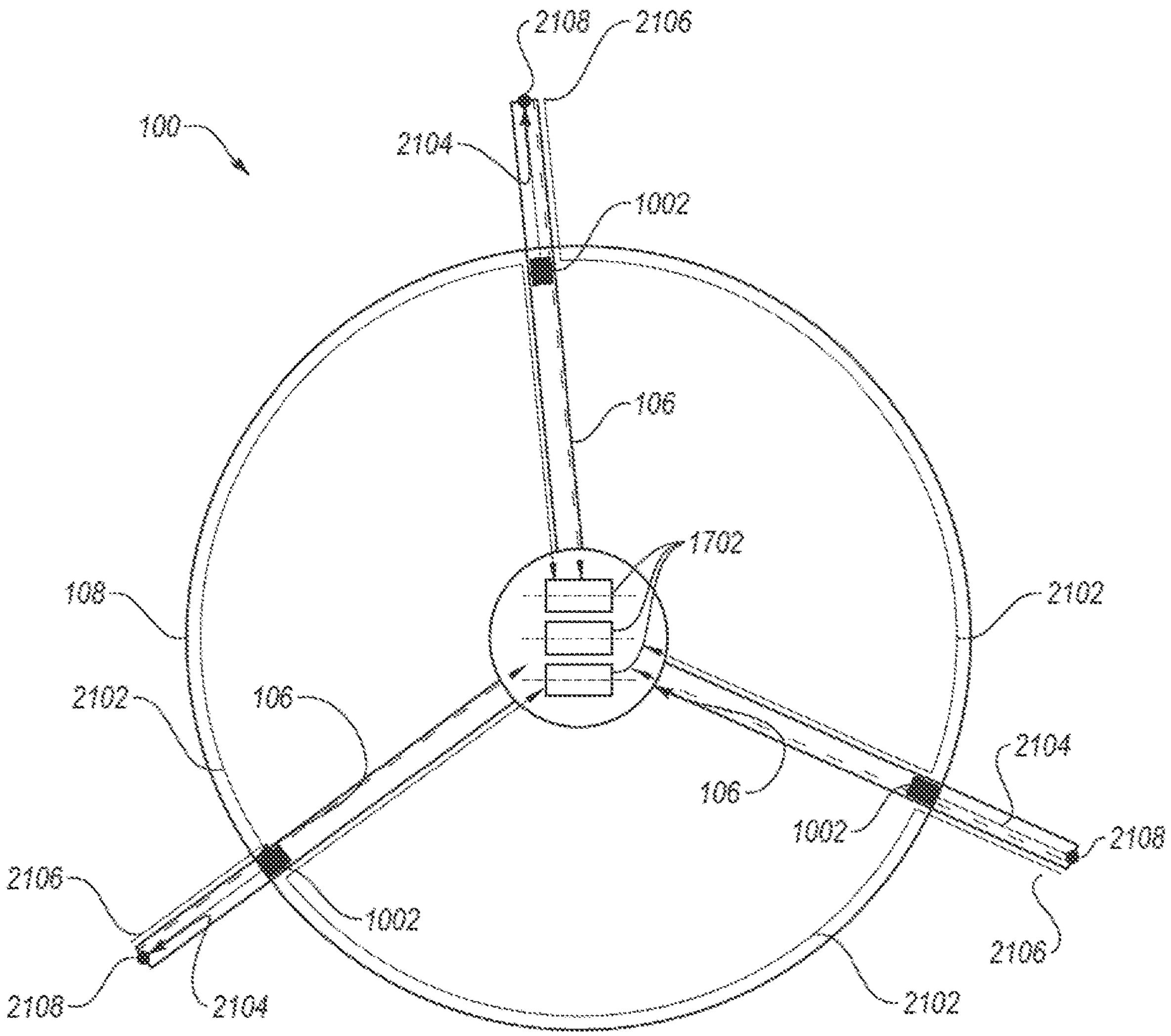
FIGS. 20 through 23 illustrate schematic views of different cable arrangements for the antenna structure of FIGS. 1 through 5.
Figure 21:
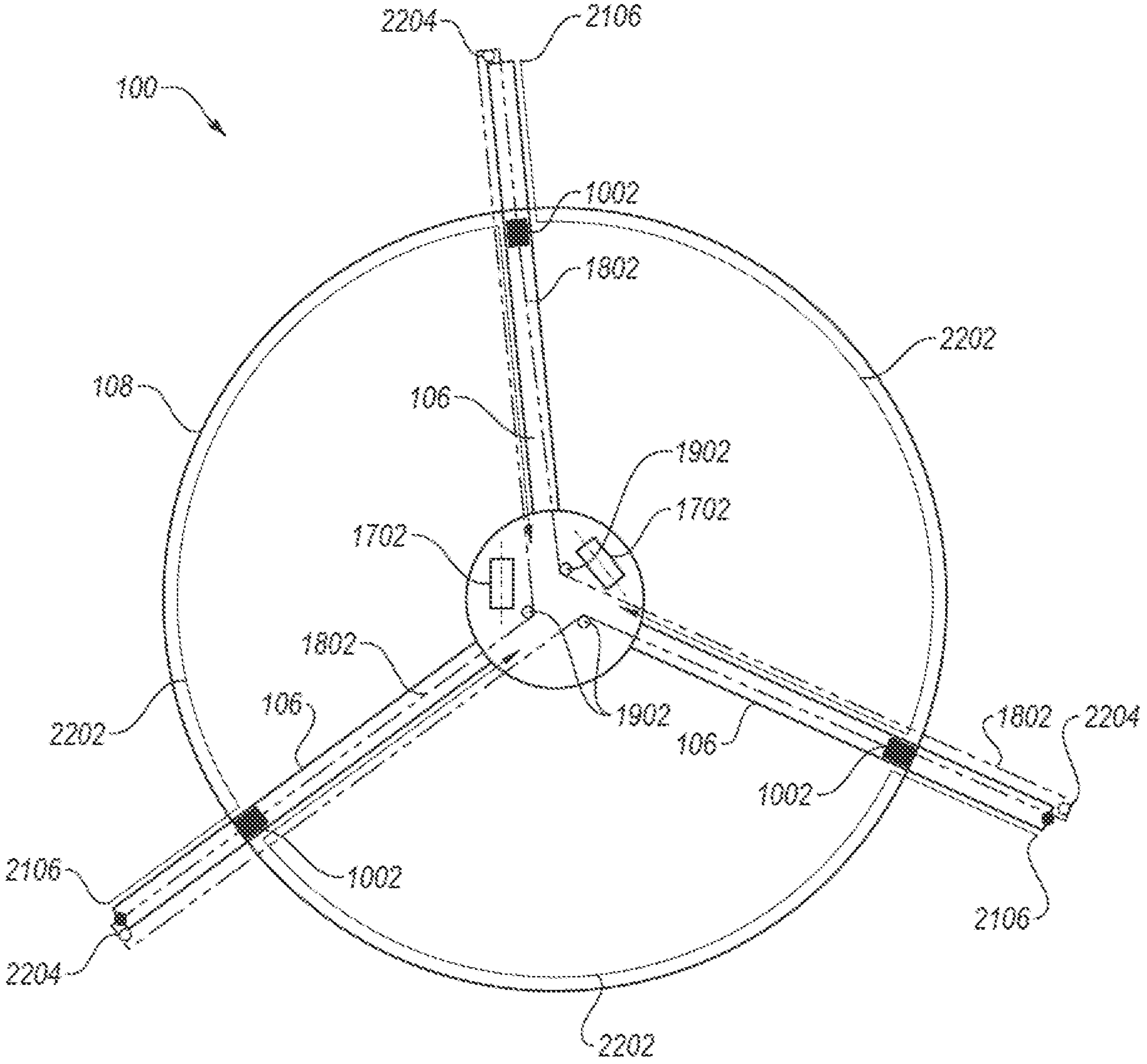
Figure 22:
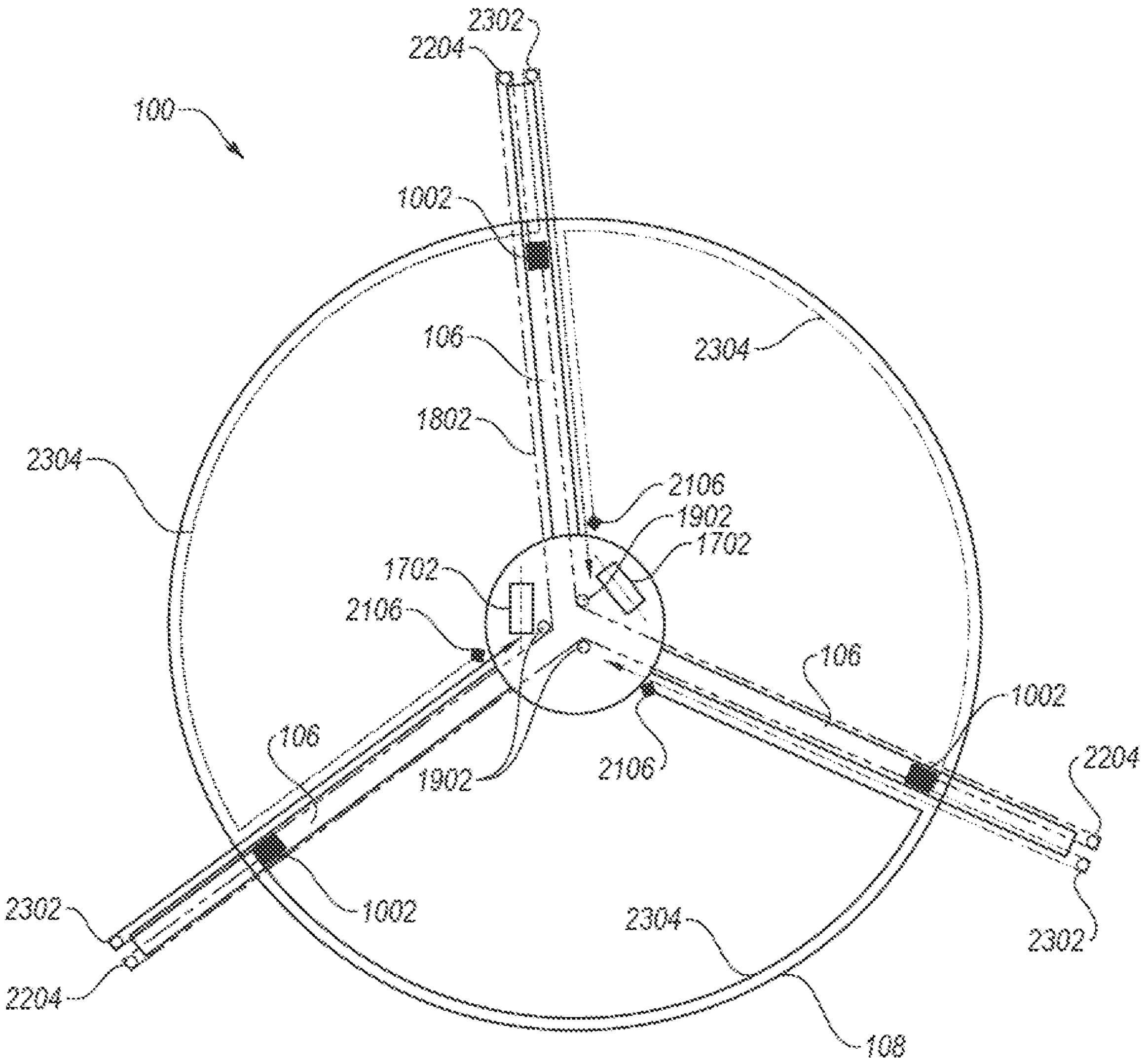
Figure 23:
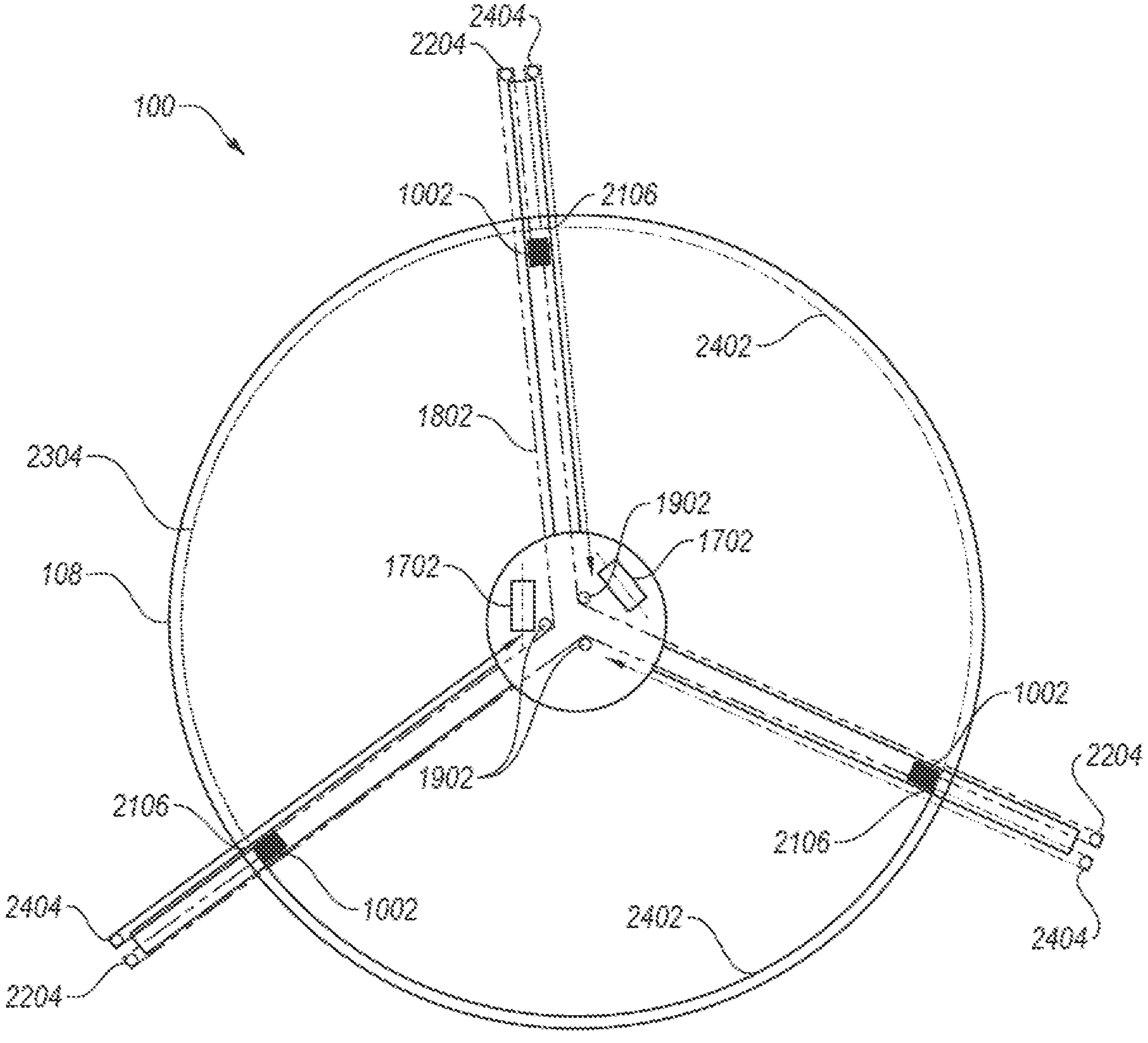

FIG. 20 through FIG. 23 illustrate different cable configurations and arrangements. FIG. 20 illustrates a cable configuration utilizing a separate cable and spool for each function. FIG. 21 through FIG. 23 illustrate different arrangements where at least one cable performs multiple functions.

The cable arrangement illustrated in FIG. 20 includes three spools 1702 in a central portion of the antenna 100. One spool 1702 may be coupled to a hinge cable 812 (FIG. 8A, FIG. 8B) that may travel within the arms 106. As described above, the spool 1702 may be coupled to multiple hinge cables 812, such as one for each arm 106. Thus, all three hinge cables 812 may be wound by the same spool 1702.

Another spool 1702 may be coupled to a carrier drive cable 2104, which may pass through a pulley 2108 at a distal end of the arm 106 and then be coupled to a carrier 1002. As the spool 1702 winds the carrier drive cable 2104 onto the spool the carrier drive cable 2104 pulls the carrier 1002 toward the pulley 2108 at the distal end of the arm 106. Each of the carrier drive cables 2104 may be coupled to the same spool 1702 similar to the hinge cables 812 described above, such that one spool 1702 may drive all of the carriers 1002.

A third spool 1702 may be coupled to an expandable structure drive cable 2102. The expandable structure drive cable 2102 may enter a section (e.g., sections 1614 (FIG.

15)) of the expandable structure 108 through an arm 106 at a first end of the section and pass through the section of the expandable structure 108 before terminating at a termination 2106 at the distal end of an arm 106 at a second end of the section of the expandable structure 108. The expandable structure drive cable 2102 may pass through the diagonal truss structures 310 of the section of the expandable structure 108, such that as the expandable structure drive cable 2102 is wound onto the third spool 1702, the diagonal truss structures 310 may shorten to expand the expandable structure 108. Similar to the spools 1702 associated with the hinge cables 812 and the carrier drive cables 2104, the third spool 1702 may be coupled to all of the expandable structure drive cables 2102, such that the third spool 1702 may drive all of the sections of the expandable structure 108.

FIG. 21 illustrates an arrangement including two spools 1702 in a central portion of the antenna 100. Similar to the arrangement of FIG. 20, one spool 1702 may be coupled to a hinge cable 812 (FIG. 8A, FIG. 8B) that may travel within the arms 106. As described above, the spool 1702 may be coupled to multiple hinge cables 812, such as one for each arm 106. Thus, all three hinge cables 812 may be wound by the same spool 1702.

The second spool 1702 may be coupled to a drive cable 2202. The drive cable 2202 may extend down a first arm 106 where the drive cable 2202 may enter a first side of a section (e.g., section 1614 (FIG. 15)) of the expandable structure 108 through a first carrier 1002. The drive cable 2202 may pass through the section of the expandable structure 108 and exit the section on a second opposite end of the section through another carrier 1002 on a second arm 106. The drive cable 2202 then passes through the carrier 1002 and extends down the second arm 106 to a termination 2106 at a distal end of the second arm 106. As the second spool 1702 draws in the drive cable 2202, the drive cable 2202 may shorten the diagonal truss structures 310 of the expandable structure 108 in the associated section of the expandable structure 108. The drive cable 2202 may also draw the second carrier 1002 toward the termination 2106 at the distal end of the second arm 106.

The arrangement illustrated in FIG. 21 may also include a synchronizing cable 1802, which may pass between each of the carriers 1002. For example, the synchronizing cable 1802 may include multiple segments. Each segment may extend from a first carrier 1002 around a synchronizing pulley 2204 at a distal end of a first arm associated with the first carrier 1002. The segment of the synchronizing cable 1802 may then run along the first arm to a central portion of the antenna 100, where the segment of the synchronizing cable 1802 may pass around a synchronizing pulley 1902, which directs the segment of the synchronizing cable 1802 to a second arm 106. The segment of the synchronizing cable 1802 may then run along the second arm 106 to a second carrier 1002 traveling along the second arm 106. Thus, as the second carrier 1002 travels down the second arm 106, the segment of the synchronizing cable 1802 may pull the first carrier 1002 toward the distal end of the first arm 106. Therefore, the synchronizing cable 1802 may cause the carriers 1002 to move along their respective arms 106 at substantially the same rate.

FIG. 22 illustrates an arrangement including two spools 1702 in a central portion of the antenna 100. Similar to the arrangement of FIG. 20 and FIG. 21, one spool 1702 may be coupled to a hinge cable 812 (FIG. 8A, FIG. 8B) that may travel within the arms 106. As described above, the spool 1702 may be coupled to multiple hinge cables 812, such as one for each arm 106. Thus, all three hinge cables 812 may be wound by the same spool 1702.

The second spool 1702 may be coupled to a drive cable 2304. The drive cable 2304 may extend down a first arm 106 where the drive cable 2202 may enter a first side of a section (e.g., section 1614 (FIG. 15)) of the expandable structure 108. The drive cable 2304 may pass through the section of the expandable structure 108 and exit the section on a second opposite end of the section through a carrier 1002 on a second arm 106. The drive cable 2304 then passes through the carrier 1002 and extend down the second arm 106 to a pulley 2302 at a distal end of the second arm 106. The drive cable 2304 may then return down the second arm 106 to a termination 2106 near the central portion of the antenna 100. As the second spool 1702 draws in the drive cable 2304, the drive cable 2304 may shorten the diagonal truss structures 310 of the expandable structure 108 in the associated section of the expandable structure 108. The drive cable 2304 may also draw the second carrier 1002 toward the pulley 2302 at the distal end of the second arm 106.

The arrangement illustrated in FIG. 22 may also include a synchronizing cable 1802, similar to the arrangement of FIG. 21, which may pass between each of the carriers 1002. As described above, the synchronizing cable 1802 may include multiple segments that may extend from a first carrier 1002 around a synchronizing pulley 2204 at a distal end of a first arm then around a synchronizing pulley 1902 in a central portion of the 100 before running along a second arm 106 to a second carrier 1002 traveling along the second arm 106. As the second carrier 1002 travels down the second arm 106, the segment of the synchronizing cable 1802 may pull the first carrier 1002 toward the distal end of the first arm 106. Thus, the synchronizing cable 1802 may cause the carriers 1002 to move along their respective arms 106 at substantially the same rate.

FIG. 23 illustrates an arrangement including two spools 1702 in a central portion of the antenna 100. Similar to the arrangement of FIG. 20, FIG. 21, and FIG. 22, one spool 1702 may be coupled to a hinge cable 812 (FIG. 8A, FIG. 8B) that may travel within the arms 106. As described above, the spool 1702 may be coupled to multiple hinge cables 812, such as one for each arm 106. Thus, all three hinge cables 812 may be wound by the same spool 1702.

The second spool 1702 may be coupled to a drive cable 2402. The drive cable 2402 may extend down a first arm 106 where the drive cable 2202 may pass around a pulley 2404 at a distal end of the first arm 106. The drive cable 2402 may then enter a first side of a section (e.g., section 1614 (FIG. 15)) of the expandable structure 108 through a first carrier 1002. The drive cable 2402 may pass through the section of the expandable structure 108 and exit the section on a second opposite end of the section through a second carrier 1002 on a second arm 106. The drive cable 2402 may then terminate at the second carrier 1002 at a termination 2106. As the second spool 1702 draws in the drive cable 2402, the drive cable 2402 may draw the first carrier 1002 toward the pulley 2404 at the distal end of the first arm 106. The drive cable 2402 may also shorten the diagonal truss structures 310 of the expandable structure 108 in the associated section of the expandable structure 108.

The arrangement illustrated in FIG. 23 may also include a synchronizing cable 1802, similar to the arrangement of FIG. 21 and FIG. 22, which may pass between each of the carriers 1002. As described above, the synchronizing cable 1802 may include multiple segments that may extend from a first carrier 1002 around a synchronizing pulley 2204 at a distal end of a first arm then around a synchronizing pulley 1902 in a central portion of the 100 before running along a second arm 106 to a second carrier 1002 traveling along the second arm 106. As the second carrier 1002 travels down the second arm 106, the segment of the synchronizing cable 1802 may pull the first carrier 1002 toward the distal end of the first arm 106. Thus, the synchronizing cable 1802 may cause the carriers 1002 to move along their respective arms 106 at substantially the same rate.

Embodiments of the disclosure may facilitate the creation of expandable antenna structures that expand from a central hub. The expandable antenna structures according to embodiments of the disclosure may have greater rigidity when deployed than expandable antenna structures that expand from a side mounted structure. The increased rigidity may facilitate, for example, rapid slewing of the associated antenna system independent of the main body of an associated satellite to track objects from space The mass of the expandable antenna structures may also be less than the mass of side mounted expandable antenna structures. The greater rigidity may facilitate larger antenna structures to be produced, such as 60 feet or more in diameter. Larger antenna structures may increase a gain of the reflector antenna system, which may improve signal reception and/or reflection, which may increase coverage areas and signal quality. The greater rigidity may also improve the surface accuracy of the reflector, which may further improve signal reception and/or reflection. The embodiments of the disclosure may also reduce the number of moving components in an expandable antenna. Reducing the moving parts may result in a more robust design with high reliability. Reducing the moving parts may also reduce the stowed volume and/or weight of the antenna structure. In aerospace applications, where volume and weight of the associated vehicle are restricted, reducing the volume and space requirements of the antenna structure may result in the vehicle being able to carry additional components and/or may facilitate a larger expandable antenna structure.

The embodiments of the disclosure described above and illustrated in the accompanying drawing figures do not limit the scope of the invention, since these embodiments are merely examples of embodiments of the invention, which is defined by the appended claims and their legal equivalents. Any equivalent embodiments are intended to be within the scope of this disclosure. Indeed, various modifications of the disclosure, in addition to those shown and described herein, such as alternative useful combinations of the elements described, may become apparent to those skilled in the art from the description. Such modifications and embodiments are also intended to fall within the scope of the appended claims and their legal equivalents.

What is claimed is:

1. A deployable reflector structure comprising:
a base in a central portion of the deployable reflector structure;
a cable drive system secured to the base in the central portion of the deployable reflector structure;
at least two arms configured to extend from the base, the at least two arms secured to the base through a hinge structure;
a hinge pulley secured to the base in a position offset from a pivot of the hinge structure, a cable passing from the cable drive system over the hinge pulley and secured to an anchor in the at least two arms, where the cable drive system is configured to rotate the at least two arms away from the central portion of the deployable reflector structure through tension in the cable;
an expandable structure coupled to the at least two arms;
a driving cable coupled to the cable drive system on a first end of a first arm of the at least two arms, the driving cable passing around a pulley at a second end of the first arm of the at least two arms opposite the first end before passing into a carrier positioned on a second arm of the at least two arms through the expandable structure; and
a reflector mesh coupled between the one or more arms and the base.

2. The deployable reflector structure of claim 1, wherein the carrier couples the expandable structure to the second arm of the at least two arms.

3. The deployable reflector structure of claim 2, wherein the carrier is configured to move along the second arm of the at least two arms.

4. The deployable reflector structure of claim 2, further comprising a cable configured to pull the carrier in a direction toward a distal end of the second arm of the at least two arms.

5. The deployable reflector structure of claim 1, wherein the hinge pulley is positioned a distance from a pivot of the hinge structure, wherein tension in the cable about the hinge pulley is configured to generate a moment on the hinge structure to drive the hinge structure to an expanded configuration.

6. An expandable antenna structure comprising:
at least two arms;
an expandable structure coupled to the at least two arms;
a reflector mesh coupled between the at least two arms and a base;
a first carrier slidably coupled to a first arm of the at least two arms, the first carrier coupled to a section of the expandable structure on a first end of the section of the expandable structure;
a second carrier slidably coupled to a second arm of the at least two arms, the second carrier coupled to a second end of the section of the expandable structure opposite the first end;
a cable drive apparatus; and
a driving cable coupled to the cable drive apparatus on a first end of an arm of the at least two arms, the driving cable passing around a pulley at a second end of the arm of the at least two arms opposite the first end before passing into at least one of the first carrier and the second carrier and through diagonal truss structures in the section of the expandable structure, the diagonal truss structures defining an alternating diagonal path through the section of the expandable structure from the first end of the section of the expandable structure to the second end of the expandable structure.

7. The expandable antenna structure of claim 6, wherein the driving cable passes through the first carrier into the section of the expandable structure.

8. The expandable antenna structure of claim 6, wherein the driving cable terminates at the second carrier.

9. The expandable antenna structure of claim 6, wherein the driving cable passes through the second carrier at the second end of the section of the expandable structure and terminates at a distal end of the second arm.

10. The expandable antenna structure of claim 6, wherein the driving cable passes through the second carrier at the second end of the section of the expandable structure and terminates at a central portion of the expandable antenna structure.

11. The expandable antenna structure of claim 6, further comprising a synchronizing cable extending between the first carrier and the second carrier.

12. A method of extending an antenna, the method comprising:

rotating at least two arms away from a base of a tower;

spooling a drive cable onto a spool;

sliding a first carrier along a first arm of the at least two arms;

sliding a second carrier along a second arm of the at least two arms;

pulling at least one of the first carrier and the second carrier along at least one of the first arm and the second arm with the drive cable driven by a cable drive apparatus on a first end of at least one of the first arm and the second arm, where the drive cable passes around a pulley at a second end of at the least one of the first arm and the second arm of the at least two arms opposite the first end before passing into at least one of the first carrier and the second carrier; and shortening a diagonal truss member of an extendable structure with the drive cable, where the diagonal truss member defines an alternating diagonal path through the extendable structure, the extendable structure is coupled to the at least two arms through the first carrier and the second carrier, and the drive cable passes through the diagonal truss member of the extendable structure causing the extendable structure to expand away from the tower stretching a reflector mesh coupled between the rotating at least two arms and the base.

13. The method of claim 12, wherein pulling at least one of the first carrier and the second carrier along at least one of the first arm and the second arm comprises pulling the at least one of the first carrier and the second carrier toward a drive cable termination positioned at a distal end of the at least one of the first arm and the second arm.

14. The method of claim 12, wherein pulling at least one of the first carrier and the second carrier along at least one of the first arm and the second arm comprises: pulling the at least one of the first carrier and the second carrier toward the pulley.

15. The method of claim 12, wherein shortening the diagonal truss member of the extendable structure comprises shortening a length of the drive cable between the first arm and the second arm.

* * * * *